US011662726B2

(12) United States Patent
Bashkirov et al.

(10) Patent No.: US 11,662,726 B2
(45) Date of Patent: May 30, 2023

(54) CONTROLLING MOVEMENT OF A DEVICE

(71) Applicant: NOKIA SOLUTIONS AND NETWORKS OY, Espoo (FI)

(72) Inventors: Vladimir Bashkirov, Helsinki (FI); Arto Kristian Suvitie, Helsinki (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 189 days.

(21) Appl. No.: 17/073,104

(22) Filed: Oct. 16, 2020

(65) Prior Publication Data

US 2021/0116920 A1 Apr. 22, 2021

(30) Foreign Application Priority Data

Oct. 17, 2019 (FI) ..................................... 20195896

(51) Int. Cl.
  *G05D 1/00* (2006.01)
  *G05D 3/00* (2006.01)
  (Continued)

(52) U.S. Cl.
  CPC ........... *G05D 1/0088* (2013.01); *G01C 21/20* (2013.01); *G01C 21/3461* (2013.01);
  (Continued)

(58) Field of Classification Search
  CPC .. G05D 1/0088; G05D 1/0206; G05D 1/0212; G05D 1/101; G05D 1/106;
  (Continued)

(56) References Cited

U.S. PATENT DOCUMENTS 6,259,988 B1 * 7/2001 Galkowski ........... G05D 1/0005
  340/995.22
9,026,272 B2 5/2015 Kokkeby et al.
  (Continued)

FOREIGN PATENT DOCUMENTS

CN 103528586 A 1/2014
CN 107544502 A 1/2018
  (Continued)

OTHER PUBLICATIONS

Cabreira et al., "Survey on Coverage Path Planning with Unmanned Aerial Vehicles", Drones 2019 (Jan. 2019), 38 pages.
  (Continued)

*Primary Examiner* — Abby Y Lin
*Assistant Examiner* — Sohana Tanju Khayer
(74) *Attorney, Agent, or Firm* — Alston & Bird LLP

(57) ABSTRACT

Apparatuses and methods for movement control of a device are disclosed. The apparatus comprises memory for storing information of patterns covering sectors of the area indicating whether the patterns have at least one item relevant to movement in the area. The information has been configured based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached. A processor is configured to determine whether a search path between first and second locations extends through at least one pattern having at least one item relevant to movement in the area, and to selectively use a path finding algorithm to determine a path of movement within at least one pattern with relevant items through which the search path is determined to extend.

20 Claims, 16 Drawing Sheets

(51) Int. Cl.
  *G06F 7/00*     (2006.01)
  *G06F 17/00*    (2019.01)
  *G01C 21/34*    (2006.01)
  *G05D 1/02*     (2020.01)
  *G05D 1/10*     (2006.01)
  *G08G 3/02*     (2006.01)
  *G08G 5/00*     (2006.01)
  *G08G 5/04*     (2006.01)
  *G01C 21/20*    (2006.01)

(52) U.S. Cl.
  CPC .......... *G05D 1/0212* (2013.01); *G05D 1/101* (2013.01); *G05D 1/106* (2019.05); *G08G 3/02* (2013.01); *G08G 5/003* (2013.01); *G08G 5/006* (2013.01); *G08G 5/0013* (2013.01); *G08G 5/0026* (2013.01); *G08G 5/0043* (2013.01); *G08G 5/0069* (2013.01); *G08G 5/045* (2013.01)

(58) Field of Classification Search
  CPC .. G01C 21/20; G01C 21/203; G01C 21/3461; G08G 3/02; G08G 5/0013; G08G 5/0026; G08G 5/003; G08G 5/0043; G08G 5/006; G08G 5/0069; G08G 5/045
  See application file for complete search history.

(56) References Cited

U.S. PATENT DOCUMENTS

| | | | |
|---|---|---|---|
| 2007/0226314 A1 | 9/2007 | Eick et al. | |
| 2015/0066248 A1* | 3/2015 | Arbeit | G08G 5/0069 701/2 |
| 2016/0210865 A1* | 7/2016 | Mizutani | G08G 5/0034 |
| 2017/0116863 A1* | 4/2017 | Valls Hernández | G08G 5/0052 |
| 2017/0193830 A1 | 7/2017 | Fragoso et al. | |
| 2018/0017973 A1* | 1/2018 | Teague | G08G 5/0069 |
| 2018/0211541 A1* | 7/2018 | Rakah | G08G 1/148 |
| 2018/0233050 A1* | 8/2018 | Valls Hernández | G01C 21/20 |
| 2019/0051198 A1* | 2/2019 | Nimmagadda | G05D 1/0066 |
| 2021/0049901 A1* | 2/2021 | Young | G08G 1/0969 |

FOREIGN PATENT DOCUMENTS

| | | |
|---|---|---|
| CN | 108052102 A | 5/2018 |
| CN | 108204814 A | 6/2018 |
| CN | 108508900 A | 9/2018 |
| EP | 2560142 A2 | 2/2013 |
| EP | 3 045 864 A1 | 7/2016 |
| EP | 3 118 578 A1 | 1/2017 |

OTHER PUBLICATIONS

Office Action and Search Report for Finnish Application No. 20195896 dated Feb. 13, 2020, 8 pages.

Oh et al., "Edge N-Level Sparse Visibility Graphs; Fast Optimal Any-Angle Pathfinding using Hierarchical Taut Paths", Conference: Symposium on Combinatorial Search 2017 (SoCS-2017), (Jun. 2017), 8 pages.

Extended European Search Report for European Application No. 20201680.4 dated Mar. 16, 2021, 9 pages.

Moizer et al., "An Onboard Navigation System for Autonomous Underwater Vehicles", 1st International Conference on Intelligent Autonomous Vehicles (Jan. 1987), pp. 449-458.

Trovato, K., "General Planning Method for Machine Coordination and Rendezvous", Journal of Circuits, Systems and Computers, World Scientific, vol. 4, No. 4 (Dec. 1994), pp. 351-377.

* cited by examiner

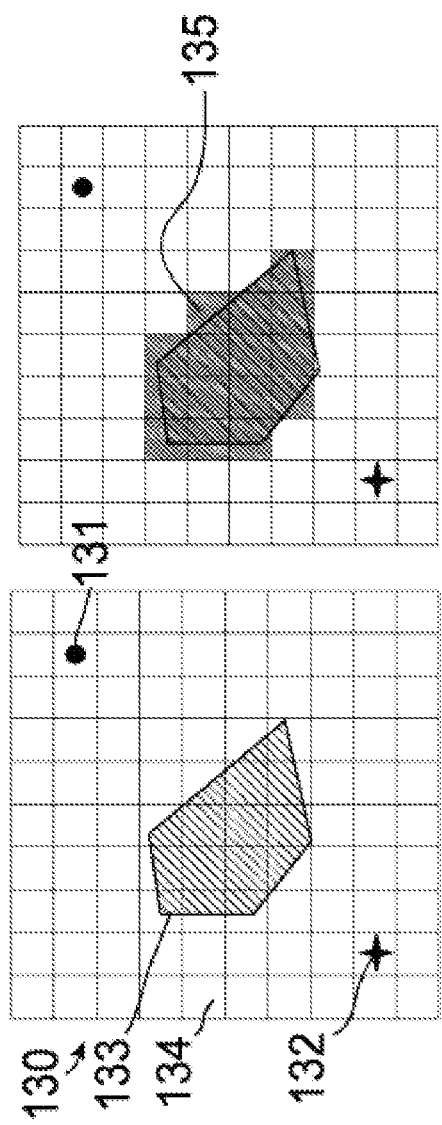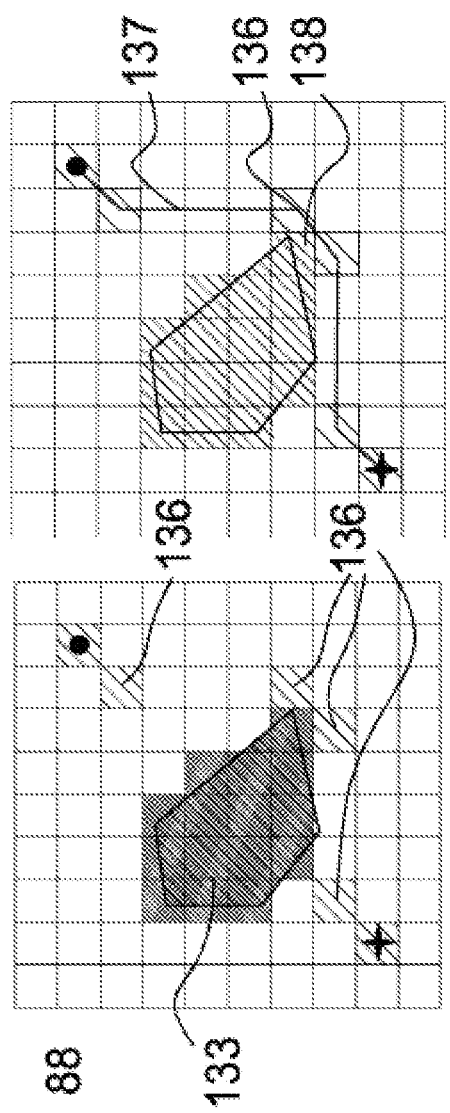

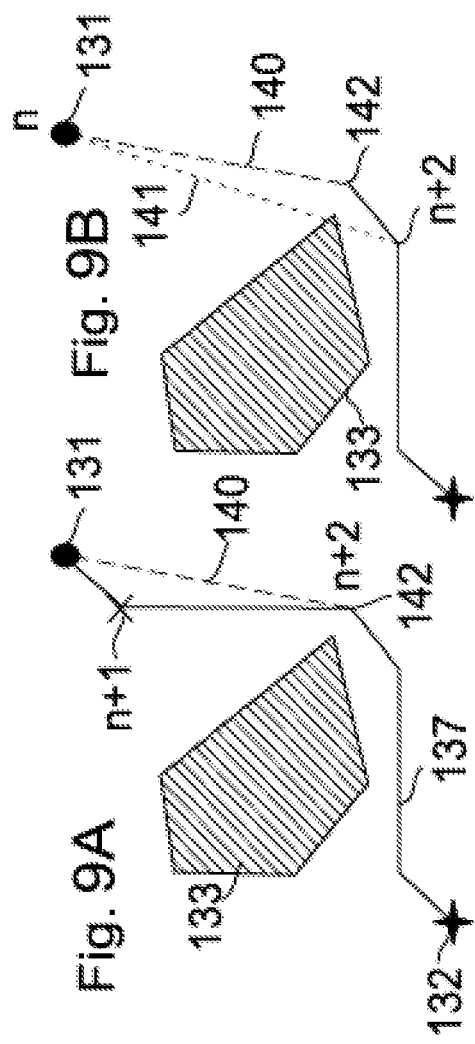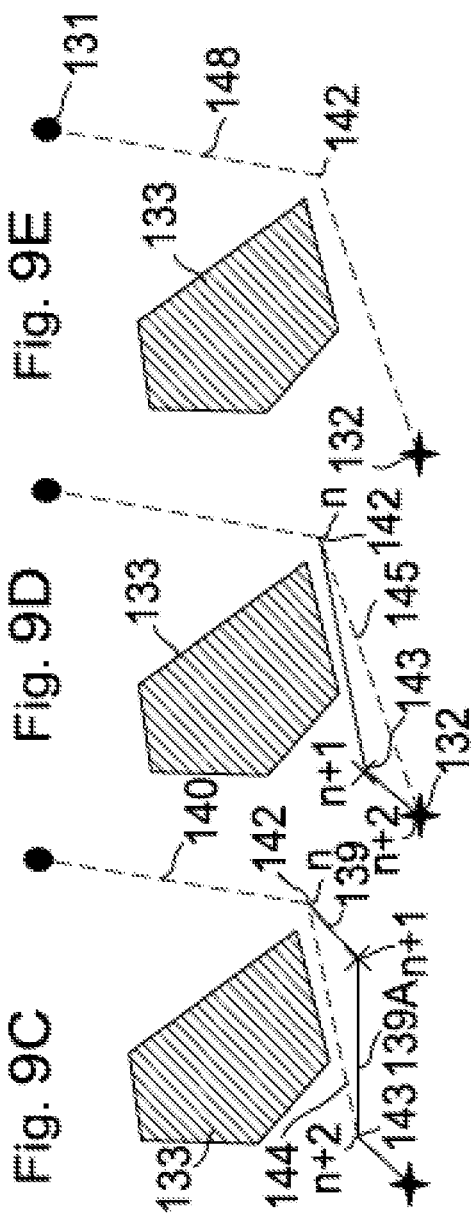

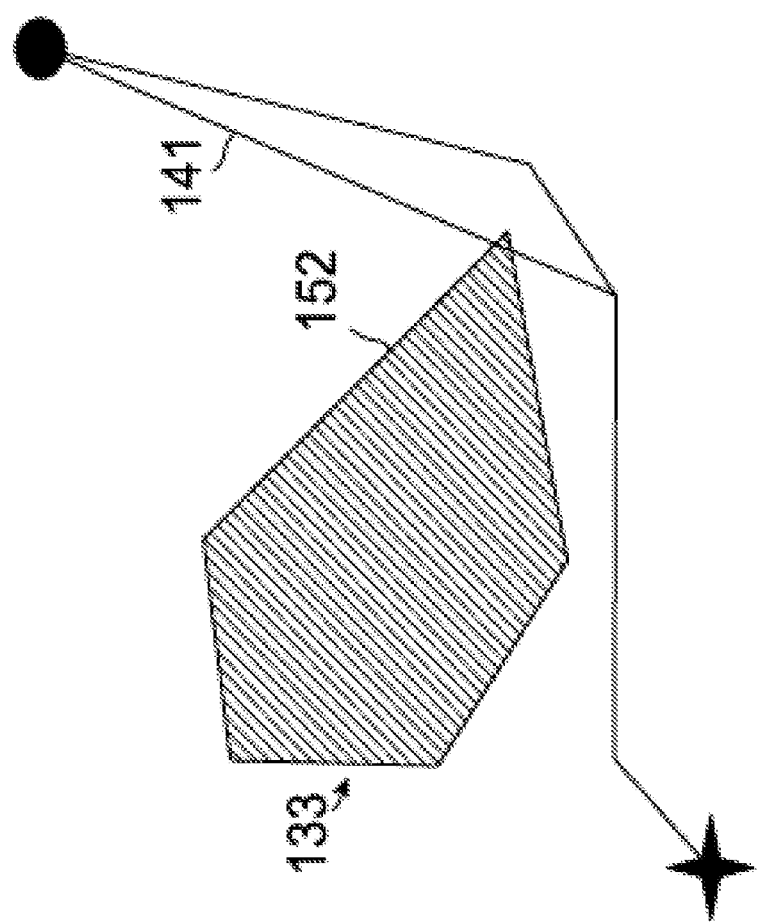

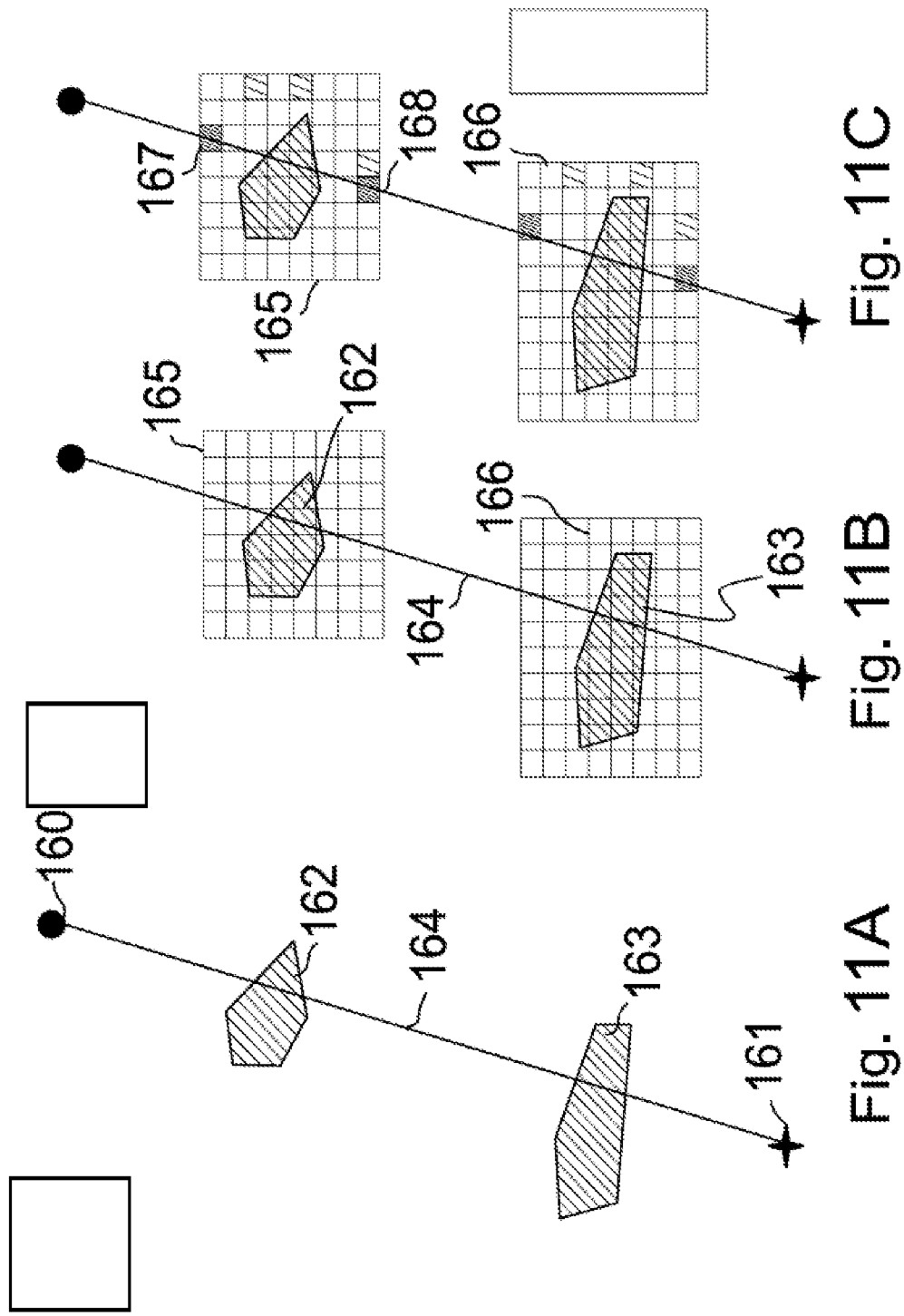

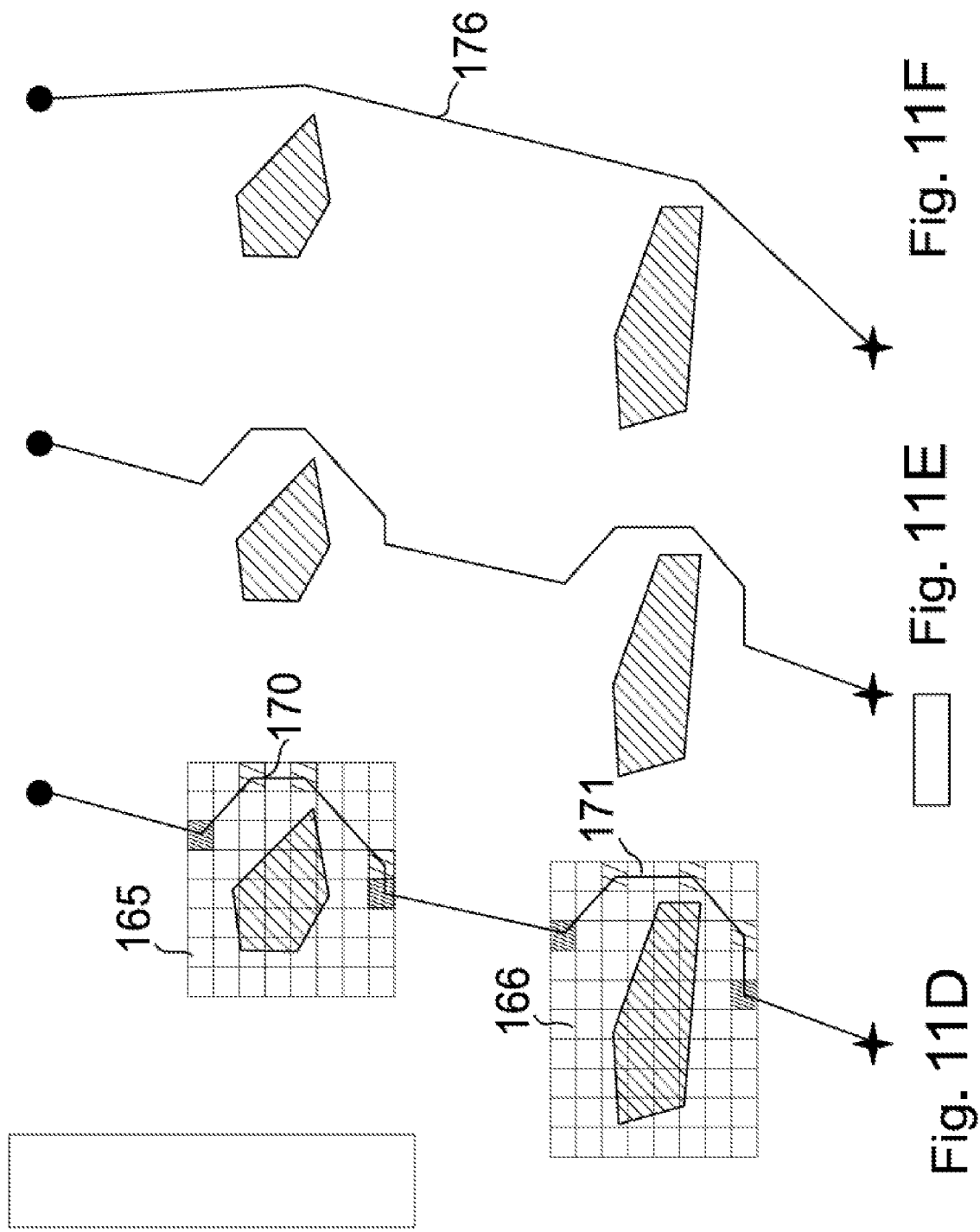

CONTROLLING MOVEMENT OF A DEVICE

CROSS-REFERENCE TO RELATED APPLICATIONS

This application claims priority to Finnish Application No. 20195896, filed Oct. 17, 2019, the entire contents of which are incorporated herein by reference.

FIELD

The present disclosure relates to methods, apparatuses and computer program products for controlling paths of movement of a device.

BACKGROUND

A vehicle or other movable device may operate autonomously or semi-autonomously based on control instructions defining movement between two locations. Control instructions may relate to various aspects of a path of movement the device shall follow. For example, instructions regarding turns, altitudes, speed, acceleration, breaking, obstacles and locations to avoid and so on may be provided. The control instructions can be provided by a control apparatus. The control apparatus can be remote. Alternatively, or in addition, at least a part of the control instructions may be provided by on-board processor apparatus. Control instructions may be provided from a remote apparatus for an unmanned device, for example, via an appropriate data communication system, for example over a wireless link.

An autonomous device can be defined as a device that is not under direct control of a human operator. An example of autonomous devices are unmanned vehicles, such as aerial vehicles (e.g. unmanned aerial vehicles (UAVs); often referred to as drones), land vehicles and watercraft and other vessels. Non-limiting examples of land vehicles comprise moving vehicles such as automotive (e.g., driverless cars, vans, heavy good vehicles, motorcycles etc.), industrial automatic guided vehicles, farming, forestry, gardening, cleaning, clearing, and surveillance and/or local control equipment and so forth. Further non-limiting examples of unmanned moving devices comprise machines such as robots, manipulators and other machines that can move in an area or space without need of direct control by a human operator.

Movement of a device can be controlled remotely by sending via a communication link control instructions from a separate control apparatus defining a path of travel to be followed. At least part of the processing may take place at the moving device.

An area where the device may move and needs to be controlled may be large. Processing the necessary information may require considerable data processing and/or memory capacity. Controlling paths of movement may cause latency and/or overhead issues.

SUMMARY

According to an aspect, there is provided an apparatus for movement control of a device in an area, the apparatus comprising: memory means for storing information of patterns covering sectors of the area, the stored information comprising indication whether the patterns have at least one item relevant to movement in the area, the information being configured based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached; and processor means configured to determine that a search path between a first location and a second location extends through at least one pattern having at least one item relevant to movement in the area and to selectively use a path finding algorithm to determine a path of movement within the determined at least one pattern through which the search path extends.

In one aspect the information may be configured based on at least in part one of determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached.

In accordance with a more detailed aspect the device comprises one of an unmanned aerial vehicle, driverless land vehicle or driverless vessel.

An apparatus may be configured to use the path finding algorithm to patterns that include items relevant to movement and have been divided to the predefined smallest pattern size. The predefined smallest pattern size may comprise the highest resolution zoom level of the patterns.

The patterns may comprise rectangular tiles. At least one of the rectangular tiles can be divided into smaller rectangular tiles in response to determining at least one item relevant to movement within the at least one rectangular tile.

The processor means can be configured to generate a path of movement for the device based on a combination of information of the search path outside the determined at least one pattern crossed by the search path and having at least one item relevant to movement and the determined path within the at least one pattern. The determined path within the at least one pattern may be combined with parts of the search path outside the determined at least one pattern. An adjustment may be made to the point of entrance of the search path to the at least one pattern, and/or a point of exit from the at least one pattern. The processor means can be configured to move a point of entrance to the determined at least one pattern and/or a point of exit from the determined at least one pattern according to the determined path within the at least one pattern. The processor means may combine the determined path within the at least one pattern with a path or paths of travel outside the at least one pattern and generated based on information of the search path and the moved point of entrance and/or point of exit.

The processor means can be configured to use the path find algorithm for patterns that have been determined to have at least one item relevant to movement. A path of movement between start and finish may be generated for an area outside the patterns that have been determined to have at least one item relevant to movement based on assumption that there are no items relevant to movement is such area.

An apparatus comprising the processor means may be configured to generate the information comprising indication whether the patterns have at least one item relevant to movement in the area based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached. The generation can be provided at the runtime of the device. According to a possibility the generation is performed before the determination of the path of movement for the device.

Items relevant to movement may comprise at least one of an obstacle, a no-go area, and a no-fly zone.

The processor means may be configured to apply a path straightening operation to an initial path output from the path finding algorithm. The processor means can be configured to determine the initial path based on a local grid on the area indicated by the determined at least one pattern. The processor means can be configured to modify the initial path by removing one turning point and testing if the modified initial path crosses the at least one item relevant to movement.

According to an aspect there is provided a method for movement control of a device, the method comprising: configuring patterns in data storage means covering sectors of a controlled area, the configuring comprising determining at least one pattern that has at least one item relevant to movement in the area, dividing the determined at least one pattern into smaller patterns, determining at least one of the smaller patterns with at least one item relevant to movement in the area, and repeating the dividing until predefined smallest pattern size is reached; determining that a search path between a first location and a second location extends through at least one of the patterns having at least one item relevant to movement; and using a path finding algorithm to determine a path of movement within the determined at least one pattern through which the search path extends.

The path finding algorithm may be used for patterns with items relevant to movement that have been zoomed to the predefined smallest pattern size.

The patterns may comprise rectangular tiles. The configuring can then comprise dividing a rectangular tile to smaller rectangular tiles in response to determining at least one item relevant to movement within the rectangular tile.

A path of movement may be generated for the device based on a combination of information of the search path outside the at least one pattern having at least one item relevant to movement and crossed by the search path and the determined path within the at least one pattern. The generating may comprise combining the determined path within the at least one pattern with parts of the search path outside the at least one pattern.

The search path may have a point of entrance to the at least one pattern and a point of exit from the at least one pattern. The generating can then comprise moving the point of entrance and/or the point of exit according to the determined path within the at least one pattern, and combining the determined path within the at least one pattern with a path or paths of travel outside the at least one pattern and generated based on information of the search path and the moved point of entrance and/or point of exit.

The search path may have a point of entrance to the at least one pattern and a point of exit from the at least one pattern, the method comprising adjusting the location of the point of entrance and/or the point of exit.

The path finding algorithm may be applied to patterns that have been determined to have at least one item relevant to movement, the path of movement being generated for an area outside the patterns based on assumption that there are no items relevant to movement within the area.

Furthermore, grid may be created on the path, parts of the path, around no-go zone, in one or more zoomed tiles, or in a combination of them. Grid may comprise 2D grid on top of the respective area. Grid may be created around the respective area by using coordinate max and min values. Path may be reconstructed by removing waypoints by straightening. Padding cells may be added around no-go zone.

A computer software product embodying at least a part of the herein described functions may also be provided. In accordance with an aspect a computer program comprises instructions for generating data in memory for movement control, wherein the generating comprises at least configuring patterns in the memory covering sectors of a controlled area, the configuring comprising determining at least one pattern that has at least one item relevant to movement in the area, dividing the determined at least one pattern into smaller patterns, determining at least one of the smaller patterns with at least one item relevant to movement in the area, and repeating the step of dividing until predefined smallest pattern size is reached.

BRIEF DESCRIPTION OF DRAWINGS

Some aspects will now be described in further detail, by way of example only, with reference to the following examples and accompanying drawings, in which:

FIGS. 8A-8D show initial path finding stages according to an example;

FIGS. 9A-9E show path clean-up operation according to an example;

FIG. 10 shows an example of an intersection check;

FIGS. 11A-11F show a further example;

DETAILED DESCRIPTION OF EXAMPLES

In general, the following detailed description is given with reference to movable devices such as vehicles that operate based on control instructions received from a remote control apparatus. It is, however, noted that although the detailed examples are given in the context of unmanned vehicles, or autonomous vehicles receiving control instructions from separate control apparatuses, the determinations and computations may also be provided partially or entirely by control apparatus provided on the moving device itself.

The examples relate to control instructions for paths of travel, in particular instructions to avoid prohibited zones such as no-fly zones (NFZ) and other no go areas. Such areas can be referred to as items relevant to movement or simply as obstacles. Different methods may be used to generate path between the starting and target points wherein at least one prohibited zone may occur in the path. For example, a path planning system may be based on use of a grid structure to cover whole path area, a grid created using zooming tiles, or a grid created around the prohibited zone(s), in order to avoid travelling through a prohibited zone. In the following various alternative solutions are provided. There are different benefits to choose one or more of these when generating the path. The whole path may have segments or sectors which are created by different ways, for example.

Figure 1:
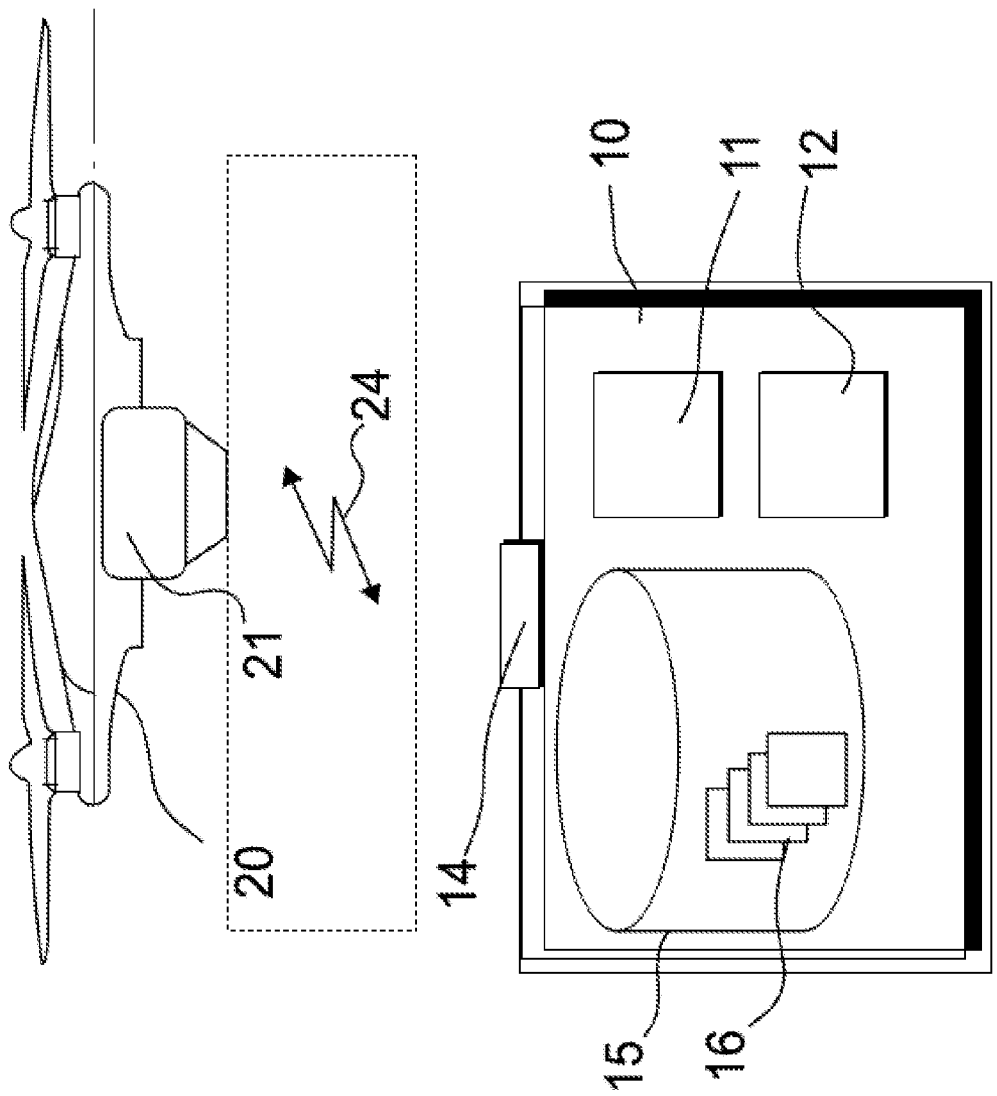
FIG. 1 illustrates an example of a device controlled at least in part based on instructions from a remote control apparatus.

FIG. 1 shows a control apparatus 10 configured for remotely controlling an unmanned device. In the example the device to be controlled comprises an unmanned aerial vehicle (UAV) 20. It shall be appreciated that the term "unmanned" does not mean that there is no human on board. Rather, the term refers to devices that can operate and move without direct human control, regardless of the presence of humans on board. In the case of UAVs, control of operation may be provided, for example, by a ground control station (GCS) configured to provide control instruction for and communicate with at least one unmanned aerial vehicle. A type of unmanned aerial vehicles is known as "drones".

The control apparatus 10 can comprise at least one processor 11, 12 and at least one memory 15. The at least one memory 15 comprises computer code that, when executed on the at least one processor, causes the apparatus to perform one or more of the herein described functions. The control apparatus 10 can be configured to communicate via appropriate data communication system using appropriate one or more communication protocols. The communications may be via local networks, wide area networks or even direct communications between the control station and the unmanned device. For example, communication may be based on $4^{th}$ or $5^{th}$ generation (4G, 5G) communication systems and protocols, or any later developments of communication systems. The communications may be carried at least in part on wireless links 24. The protocols may be based an appropriate connectionless protocol. Thus the remote control station 10 is capable of sending messages to an on-board data processing apparatus of the unmanned vehicle 20. The control station may also be configured to receive messages from the unmanned vehicle. The control apparatus can comprise data communications circuitry, denoted by reference 14, for receiving and transmitting data. It is understood that although the communications circuitry and various possible components thereof are shown as one block, the circuitry can comprise a number of circuitries. Such circuitries may share at least some components between them.

Instruction data 16 is shown to be available at the at least one memory 15. The instruction data can comprise control instructions regarding path of travel, for example information about location coordinates to be followed to control, e.g., at least one of longitude and latitude, altitude, speed, acceleration, breaking, distance, and so on. Control instruction items for a path of travel are often called waypoints. Examples for determining instructions regarding the path of travel to the unmanned device 20 will described below.

The unmanned aerial vehicle (UAV) 20 is configured to receive control information from the control station 10. The unmanned aerial vehicle of the example of FIG. 1 comprises appropriate on-board data processing apparatus that can be located within the body 21 thereof and adapted for processing instructions from the control station 10 and controlling operation of the unmanned aerial device 20 accordingly. An example for the on-board data processing apparatus will be described with reference to FIG. 2. The UAV apparatus 20 further comprises equipment for enabling the movement such as motors, rotors, and an energy source. For example, the apparatus may be powered by electrical energy, a chemical fuel, photovoltaic cells which power, in part or in full from light and so on.

Figure 2:
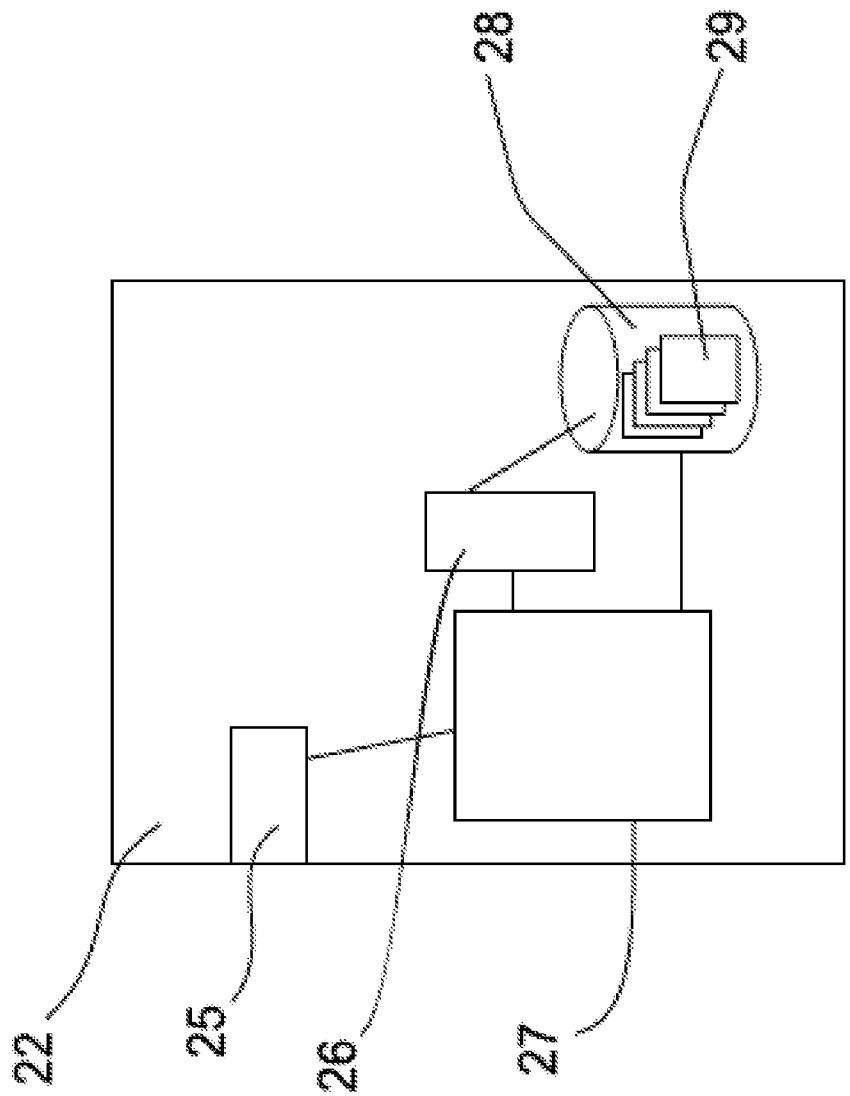
FIG. 2 shows an example of on-board control apparatus for a device.

FIG. 2 shows an example of control apparatus 22 that may execute any of the herein described operations at a moving device. The apparatus 22 comprises at least one processor 26, 27 and at least one memory 28. The at least one memory comprises computer code that, when executed on the at least one processor, causes the apparatus to perform at least one of the herein described operations. The apparatus further comprises communications interface 25. The interface provides appropriate circuitry to enable receiving and transmitting of data by the control apparatus.

The memory 28 can provide a data buffering function for control instruction data 29. The at least one data processor can read the control instructions from the buffer and cause performance of operations relating to the task to be performed accordingly. The control apparatus may be configured to provide on-board data processing apparatus. The on-board data processing apparatus of the unmanned vehicle can generate autopilot-specific instructions from the received commands.

The control station 10 may receive telemetry information from unmanned vehicles under its control. For example, an unmanned vehicle may be configured to transmit mission progress information (e.g. information about the current waypoint and remaining distance, about near-by objects, other moving vehicles, other moving vehicles in a swarm of vehicles, sensor data from the device, fleet and/or other devices and so on) to the ground control station. Information about the operating condition and/or state of the device may also be provided. For example, information about the remaining energy levels may be communicated back to the control station. The control station can then take the received information into account in the control actions, including in decision making regarding what to include in messages to the unmanned vehicle.

The following describes certain more detailed examples of determining movement paths for unmanned devices. Optimization of usage of computer resources such as processing power and dynamic memory for determining paths of movement are also described. The examples illustrate principles that can be applied to any unmanned vehicle or the like. For the purposes of illustration however the exemplifying device is specified to comprise an unmanned aerial device (UAV) and control apparatus adapted for sending of control data is referred to as a ground control station (GCS). A ground control station (GSC) computer can be configured to control one or more UAVs flying over large areas. GSC computer may comprise various features such as input and output equipment, display, keyboard, mouse, touchscreen, and so forth. The area controlled by a control station may be substantially large, for example 100×100 km or even larger.

Movement of unmanned moving vehicles such as aircraft, e.g. drones, land vehicles, watercraft, robots, and the like can be controlled based on path finding algorithms. For example, a control station such as a GCS can use specific path finding algorithms to create a safe and allowed path for a drone mission over an area. Path finding algorithms are configured to provide a path that circumvents prohibited or no-go zones or areas such as various obstacles or "Non Fly Zones" (NFZ). Using Non Fly Zones as example, it is possible that operation area of, e.g., a drone in a GCS control area may have several Non Fly Zones. These areas can be closed for various reason for flights over them, or flights on some altitudes over them. NFZ size can be anything from a few meters to some hundreds of kilometres and can be of any shape. A controlled area may have any amount and distribution of NFZs. A GCS can use a path finding algorithm to generate optimal route for a drone from location A to location B so that crossing of any NFZs is avoided. NFZs are predefined in the maps data or applications used by GCS and they can be found in real-world coordinates as polygons.

A non-limiting example of path finding algorithms is a jump point search algorithm. Jump point search algorithms can be used for multiple random distributed NFZs of any shapes. Jump point search algorithms typically use uniform grid of open and closed nodes. The grid can be 2-dimensional {latitude, longitude} or 3-dimensional {latitude, longitude, altitude}. When a drone's path requires accuracy of a few metres then a grid for a jump point search algorithm needs to have a step length of a few meters. This can consume substantial amount of memory capacity. For example, grid with a 2 m step for an area 2000×2000 m takes 1 Mbyte of computer dynamic memory in 2-dimensional (2D) case and 100 Mbytes for 3-dimensional (3D) case, assuming typical altitude range from 0 to 300 m. For an area of 100 km×100 km 250 MB for 2D and respectively 25 GB for 3D would be needed. That may exceed available memory resources of a GCS computer and make the algorithm slow. This may be the case especially on a large grid.

In one example embodiment GCS computer may monitor the path planning in relation to its memory usage or any other device having similar functionality. The path is created by adding waypoints between start and target points. If no NFZs are found in the path including start and target points, direct path is ok.

If the tile which comprises one or more NFZs in the desired path, the GCS computer may select different path finding algorithm in the tile where NFZs are found than for the other path having free of the NFZs based on, at least in part, memory needed for path planning. The tile may have intersection points An and Bn with the path between A and B in FIG. 3 for example. FIGS. 8A, B, C and D illustrate possible initial stages for path finding within a tile. FIGS. 9A-9E illustrate the shortening/looping algorithm use in the path An-Bn or whole path A-B, for example.

In example embodiment when zooming down within the tile to find smallest tile having the one or more NFZs, a different path finding algorithm can be selected for the path between the smallest tile intersections with path AB. As the smaller the tile is, the more memory is used, the selection can be further influenced by algorithm memory use.

In one example of embodiment one option is to limit the zooming level by monitoring the memory usage of the GCS computer depending on the algorithm used, or used memory. There may be a memory usage threshold until the memory usage is not any more useful. The threshold may be different for the used algorithm and/or depend on the zooming level.

One or more selection criterias might be used in path finding algorithm selection. The jump point search algorithm for the tile, where NFZs exist/s, may be used, for example.

Looping clean-up algorithm is used for cleaning and shortening the paths and/or reducing one or more waypoints received by jump point search algorithm, for example as described further in the application. Further, e.g. UAV's performance can be increased.

In accordance with an example resources can be saved and/or the operation optimised and made more efficient and faster by dividing the controlled area in smaller geometrical patterns covering sectors of the area under control. Instead of applying a path finding algorithm to the entire length of travel between locations A and B, the path finding algorithm can be applied selectively to one or some of the patterns in the route between locations A and B.

Figure 3:
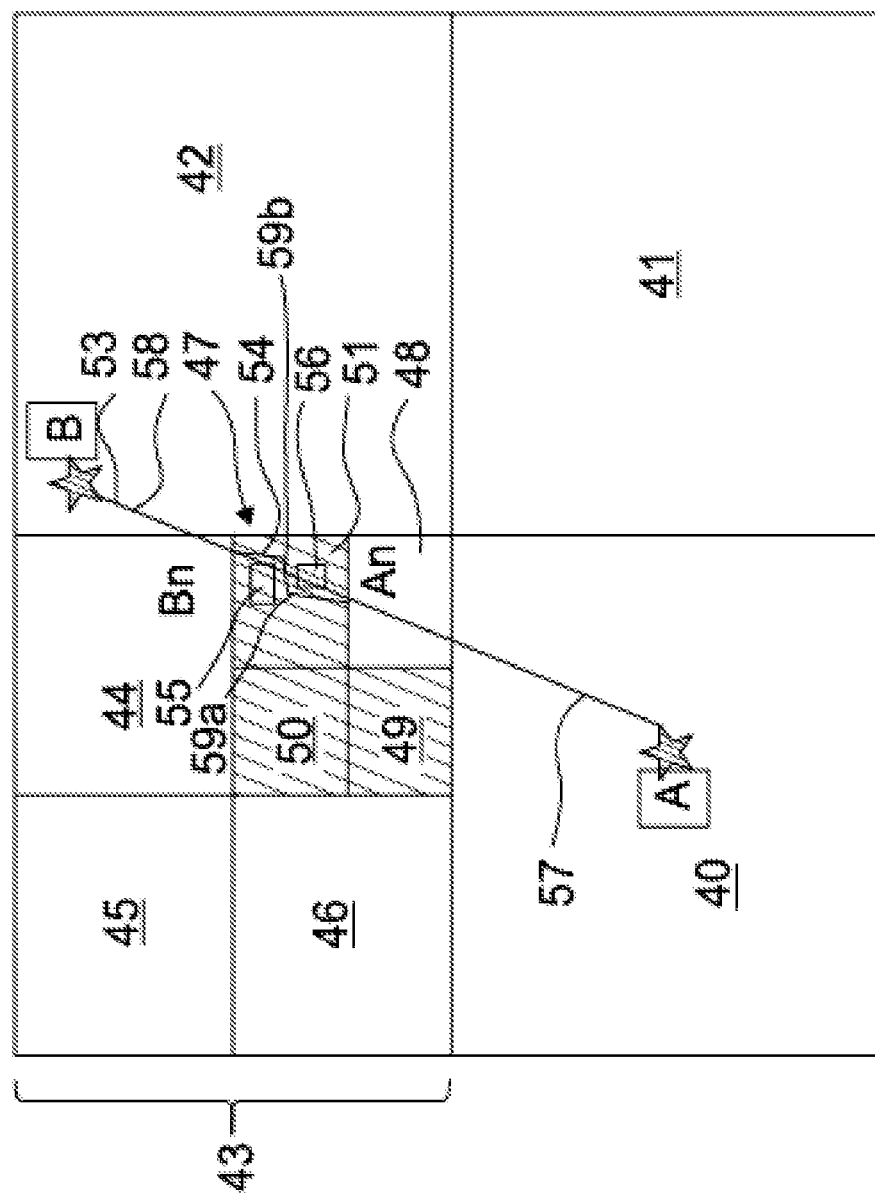
FIGS. 3, 4 and 5 illustrate path generation according to certain examples.
Figure 5:
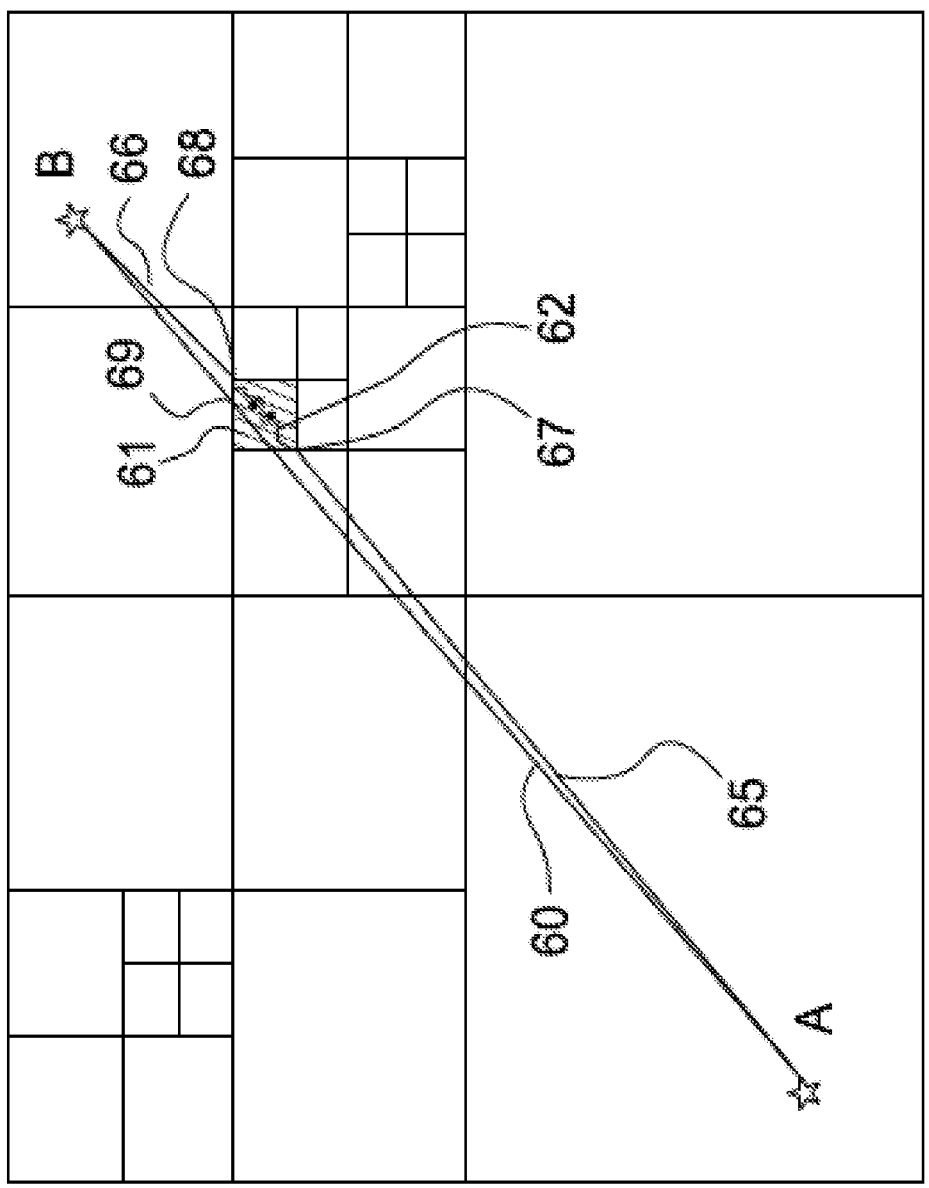

Examples of division of an area 1 to a multiple of patterns are shown in FIGS. 3 and 5. More particularly, division to rectangular patterns is shown. The size of the patterns can be altered depending on whether the patterns include items that shall be avoided by a moving device. The size of a sector covered by a pattern can be defined to be as large as possible based on information that the sector is free of travel hindering or endangering items such as physical obstacles, non-fly or no-go zones. If a large pattern comprises at least one such item, it can be divided into smaller patterns to make processing of the path finding algorithm a less demanding operation. These individual smaller patterns can be further examined to determine if any of them is free of such items. Those divided patterns with at least one relevant item can be further divided into a next division or zoom level to identify more patterns defining sectors with no relevant items and even smaller patterns with relevant items.

The process can be repeated until a predefined minimum pattern size is reached to find as many as possible patterns without items relevant to the movement in the area and smallest possible patterns with such items. That is, any of the smaller patterns still covering at least one relevant item can be further divided, i.e., zoomed to yet smaller patterns until the smallest predefined pattern size is reached, thus giving a small area that can be processed with reasonable resources. Zoom can occur in or out in digital mapping system.

If a division of a pattern results smaller patterns where each of the patterns still covers at least one relevant item, it may be advantageous to divide these patterns into next level of smaller patterns. The already divided patterns may still contain some smaller patterns that are free of relevant items, and thus it may be worth dividing to next zoom level, closer to, or until maximum zoom level. A jump point search algorithm may then be used for the found tile with at least one relevant item.

In the following the process of dividing the patterns into smaller patterns is called zooming. A purpose of zooming is to reduce the size of pattern(s) covering area(s) with items to be avoided to its minimum where after a path finding algorithm needs to be used to avoid collision with the items only in the determined small pattern(s).

In the example of FIG. 3 rectangular patterns 40 to 51, or "tiles", are shown to have three different levels of zoom such that patterns 40-42 have the largest zoom level. Patterns or tiles are parts of a digital mapping system. This can be so because these patterns do not cover any relevant items. Area 43 has been divided into smaller patterns 44-47 into the next zoom level because at least one relevant item has been defined to be located in the area 47. Area 47 has been further divided into the next zoom level where patterns 48-51 have reached the needed maximum zoom level, or to put it other way around, the predefined smallest pattern size. The zooming of patterns 47 is done because there are relevant items in the area. The smaller pattern 48 is free of any travel hindering items but grey smaller patterns 49-51 each are determined to have at least one relevant item within the coverage area thereof. Of these pattern 47 includes obstacles 55 and 56 and is determined to be on a search path 53.

The patterns can be called zoom tiles. The zoom tiles can have zoom levels from 0 to $Z_{Max}$. A zoom tile of a level (or size) that does not cover any part of any obstacle item, for example NFZ, can be provided with an indication of this in the database of the control system. Such tile does not need any more zoom in because it is already determined to be free of obstacles, i.e., a full freedom of movement is possible within the tile. Thus such tile can be indicated as free movement area and there is no need for use of a specific path finding algorithm for the area.

Any tile that does cover at least a part of any movement restricting obstacle such as a NFZ is marked accordingly in the control system. Determination of at least one item in the tile triggers zooming of the tile into a next level until the predefined smallest tile size is reached. As shown in the example of FIG. 3, in zooming operation a tile can be divided in 2×2 smaller tiles for 2-dimensional case. For a 3-dimensional case the division can be to 2×2×2 smaller tiles. Other zooming ratios can be used, for example division of the tiles to 3×3 (or 3×3×3) or 4×4 (or 4×4×4), or division (splitting) of a tile to two or three tiles and so forth, depending on the application The zooming operation is repeated until a tile is determined to be free of relevant items, or the defined maximum zoom level $Z_{Max}$ is reached for a tile. A path finding algorithm can then selectively be applied to the tiles with relevant items on the maximum zoom level. Elsewhere it can be assumed that the vehicle has the freedom to follow a direct or otherwise desired path through the tiles.

Zoom tiles for a controlled area can be initialized once, e.g., when configuring the system at the time of the system being taken into use and/or when maintenance is provided. Update may be needed only if there is a need to apply changes in obstacles in the controlled area. For example, a new high structure erected within the area may necessitate update of NFZ data in a GCS.

Zooming can be pre-set in the system and/or provided at runtime. In pre-set zooming the zooming data is defined in a database when the area is configured in the system database and then the already configured tiles are used when determining the flight path. In runtime operation the zooming, or at least part thereof, is provided during path determining operation.

In the FIG. 3 example a search path 53 for a vehicle, for example a drone, extends from location A to location B. Locations A and B may comprise longitude and latitude coordinates or locations may be converted to a location definition of the same type as has been used for start and target points. In this description illustrative label "white" tile is used to denote a tile free of items such as NFZs and illustrative label "grey" tile is used to denote a tile with at least one item such as a NFZ. Labels "white" and "grey" are only used to make the example easy to follow, and it shall be appreciated that this labelling is not intended to anyhow limit the ways how the patterns may be called, used or presented in a system operating according to the herein described principles. Similarly, NFZ is only an example of relevant items to be taken into consideration.

Any appropriate path search algorithm like 2D or 3D path finding search algorithm may be used for path determining within grey tiles that have reached the predefined maximum zoom level. For example, a jump point search algorithm may be used. Specific non-limiting examples of use of jump point search algorithms are given later in this specification.

In the example the shortest, i.e., direct search path 53 extends between locations A in tile 40 and B in tile 42. The search path 53 extends via the white tile 48 and the grey tile 51. As explained above, in the example tiles 48-51 are on the maximum zoom level, the zooming from the previous level (area covered by tile 47, which comprises smaller level tiles 48, 49, 50 and 51 like sub areas in an example) being needed because there is at least one NFZ in the area. Tile 47 comprising the smaller level tiles 48, 49, 50 and 51 is denoted by stronger border line for illustration purposes.

After zooming to the maximum level it can be determined that tile 48 is free of NFZs but tile 51 at the maximum zoom level has at least one NFZ. This triggers use of a path finding algorithm through tile 51 between tile entrance location, denoted by An, and tile exit location, denoted by Bn, i.e. intersecting parts of tile boundaries of the path. The final path of travel is a combination of the direct parts of the search path 53 through the white tiles 40, 48 and 42 and the product 54 of the path finding algorithm through the grey tile 51. In one example tiles may be numbered sequentially with a first, second and third value, based on longitude, latitude and zoom level, respectively, illustrating the tile. Location points An and Bn can be calculated from the tile and the path A-B using calculated tile corner coordinates.

In one example embodiment when the predefined minimum zooming level is reached, the tile, which has the NFZs, jump point search algorithm for generating path around the NFZs can be selected for the NFZs, for example, see also FIGS. 8A, B, C and D show possible initial stages for path finding within a tile. Further the looping clean-up algorithm may be used to the path received by the jump point search algorithm, for example. Furthermore, cleaning can be made to form path part of the product 54 of "A-An-corner 59a" to "A-corner 59a" to get shortened path by using coordinates of respective points as discussed later in the document. Also cleaning can be made to form path part of the product 54 of "corner 59b-Bn-B" to "corner 59b-B" using their coordinates of the concerned points to get shortened path as described in embodiments of FIGS. 9A-9E, for example. Grid cell coordinates 59a and 59b may be configured to be converted to real world coordinates which are used in tiles, for example.

In some embodiments the zooming level may be limited to size of tile 43, i.e. coarser tile than the tile 51. In that case the path AB has used its memory, so that it cannot use other coarse grid based path finding algorithm for smaller tiles than size of tile 43. Other sizes of tiles may generate the limit.

Figure 4:
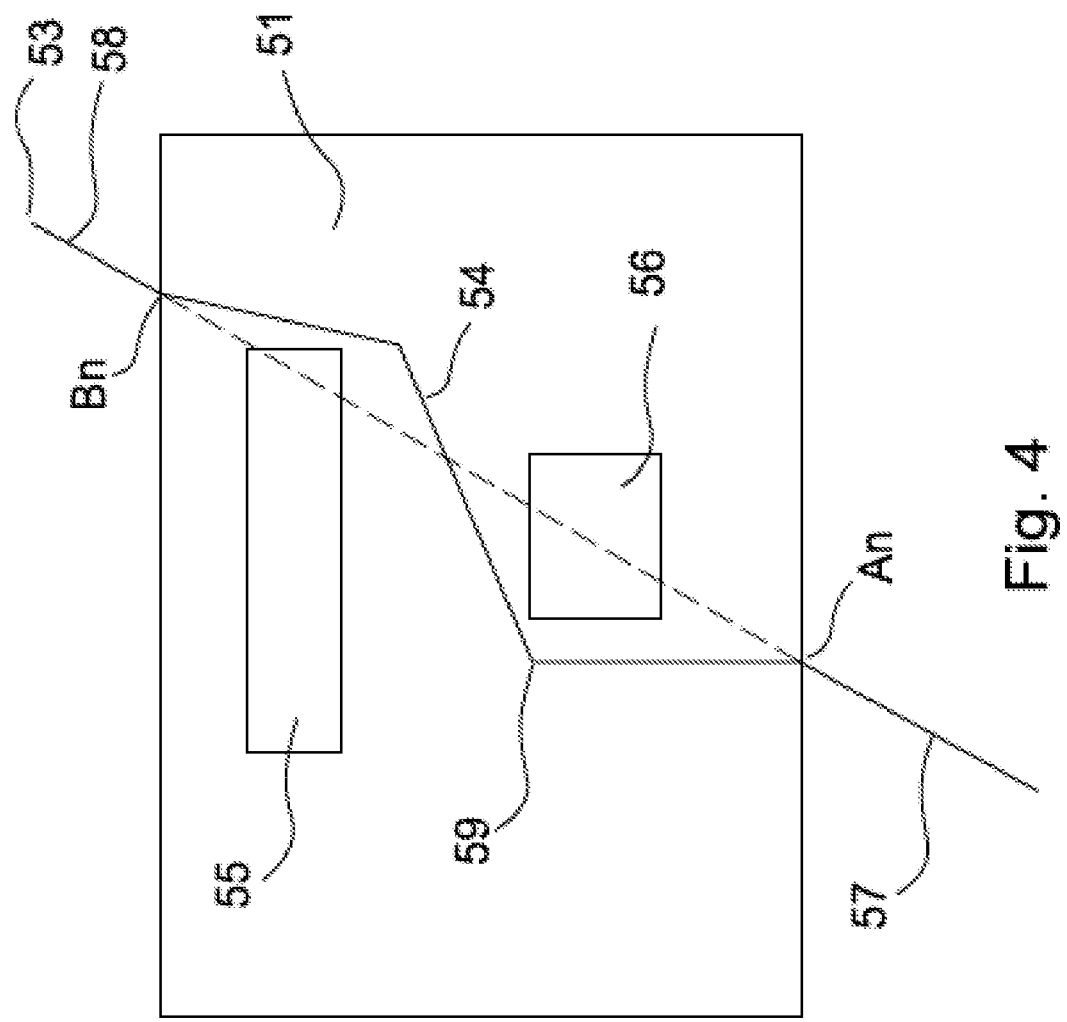

FIG. 4 shows an enlarged view of the grey tile 51 and two NFZs 55 and 56 covered by the tile 51. The direct search path 53 extends over both of the NFZs. The path finding algorithm can be triggered to determine a path 54 within the grey tile 51 between entrance location, denoted by reference An, and exit location, denoted by reference Bn, such that the path 54 circumvents the NFZs 55 and 56. The final path created by the path search algorithm would then be a combination of paths 57, 54 and 58, for example.

The path finding algorithm is needed for the area covered by the grey tile 51 since elsewhere there are only white tiles having no NFZ areas on the search path 53.

In operation according to an example, a path search algorithm from start location A to target location B starts with a search by tracing a direct line path from location A to location B on zoom level zero. If a found path does not go over any "grey" tiles it can be determined that there is a direct line A-B with length (A,B). Thus no detailed path finding operation and use of a specific path finding algorithm is needed.

The zoom level can be increased after determination of zoom level Z to zoom level Z+1. A determination can then be made if there is a path length through a particular tile on zoom level Z+1. If such grey tile is recognised, a further zoom level is analysed. At the highest resolution zoom tile level ($Z_{max}$) recognised at least one grey tile can then be subjected to a path finding algorithm. This may be provided in response to determining by the path search algorithm that the search path goes through at least one grey tile at the predefined highest zoom level $Z_{Max}$. The process can be repeated for each grey tile until an optimal path between locations A and B has been found.

The number of zoom levels can depend on the application. For example, for certain outdoor applications a maximum zoom level $Z_{Max}=18$ may be considered adequate. For certain indoor applications a maximum zoom level $Z_{Max}=21$ may be considered adequate. However, these are only examples, and other zoom and considerably different number of zoom levels may also be used.

It is also possible that no path is found over a tile. If no way over a tile is found, any path involving the tile would be blocked as a result. The algorithm can be configured to find a shortest, or otherwise optimal, non-blocked path around the tile from several examined options. A path examination results a path length. If a path is blocked in a tile infinity can be added to the length of the path to select a shortest alternative path. When possible alternative paths have been analysed, simple sorting by length procedure can give a good, or even the best candidate. If infinity setting is used, all blocked path candidates can be placed at the end of the list of candidates. Blocked paths may also be removed from the candidate list.

It is also possible that the path finding algorithm returns to larger tiles, i.e. from analysis of zoom level Z+1 to zoom level Z. This may be desired, e.g., when there is ambiguity or no grey tile is found at the highest resolution zoom level.

FIG. 5 shows another example where a direct search path 60 between locations A and B extends via grey pattern 61. The path finding algorithm is triggered because maximum zoom level is reached and there are still obstacles 69 in the pattern. However, the generated path 62 through the grey pattern 61 does not start and end at locations where the direct search path crosses the borders of the pattern 61. The path search algorithm can be configured to adjust the direct search path line 60 such that the resulting path of travel 65 enters the pattern 61 at location 67 and/or exits the pattern 61 at location 68 output by the path finding algorithm, and continues along line 66 to the destination location B.

The amended points 67 and 68 can be provided, e.g., by a grid based path finding algorithm. Paths 65 and 66 may be determined e.g. by using the solution described in FIGS. 11A to 11F and 12. Use of the local grids may be advantageous in case of one or more prohibited areas intersecting search path line 57 of FIGS. 3 and 4 or 60 of FIG. 5.

Figure 6:
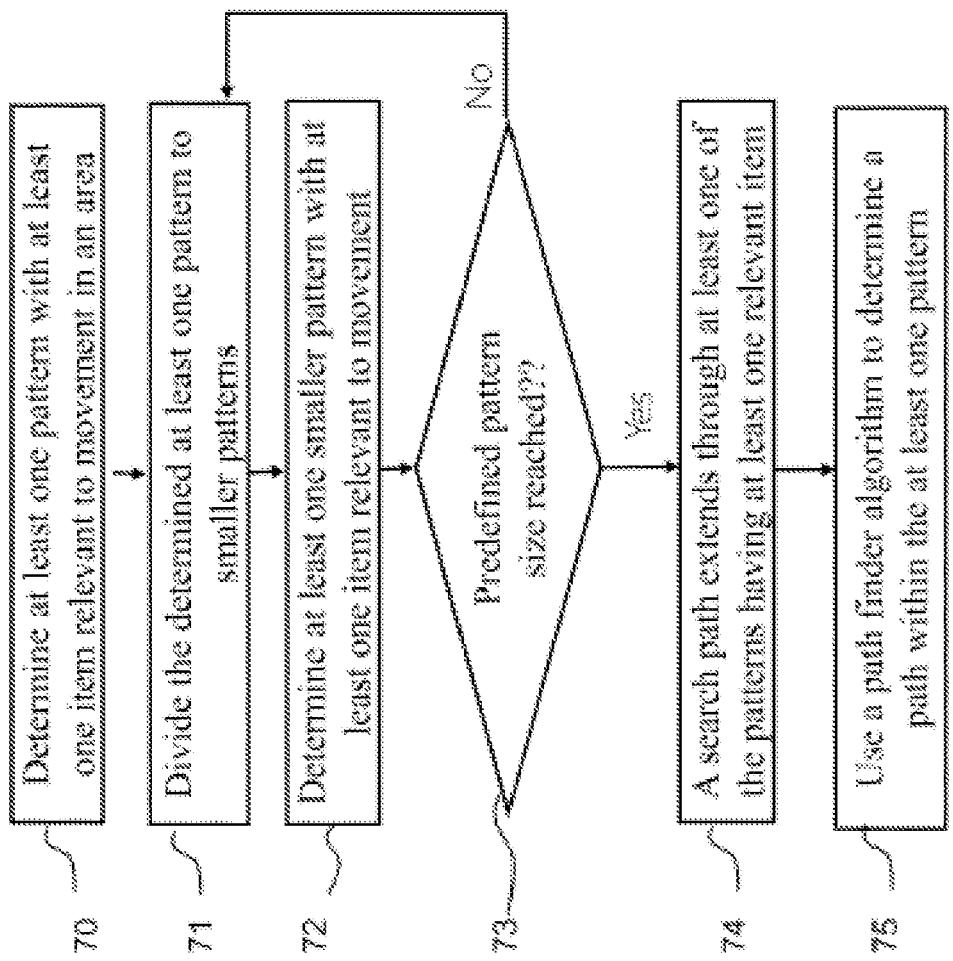
FIG. 6 is a flowchart for operation according to an example.

FIG. 6 is a flowchart in accordance with an example. In the shown method for movement control of a device, patterns covering sectors of a controlled area are configured in data storage means. The configuring comprises determining at least one pattern that has at least one item relevant to movement in the area at 70. The determined at least one pattern is divided at 71 into smaller patterns. Thereafter it is determined at 72 that at least one of the smaller patterns has at least one item relevant to movement in the area. At 73 it can be determined whether the minimum pattern size has been reached. If not, the method returns to 71, and is now applied to smaller patterns. The dividing loop is repeated until predefined smallest pattern size is reached.

In one embodiment the pattern needed is identified by zoom level identifier of the pattern and/or pattern coordinates (comparing coordinates of one or more polygon lines with path line) and comparison with data in the database of prohibited areas i.e. items relevant to movement, or bounding box area of a prohibited area.

It can then be determined at 74 that a search path between a first location and a second location extends through at least one of the patterns having at least one item relevant to movement. A path finding algorithm can then be used at 75 to determine a path of movement within the determined at least one pattern through which the search path extends. In one embodiment path can comprise parts of boarders of the pattern.

In accordance with an example the method comprises adjusting at least one of the points where the search path crosses the border of a pattern.

The configuration can be such that the path finding algorithm is used to patterns with items relevant to movement that have reached a predefined pattern size.

Figure 7A:
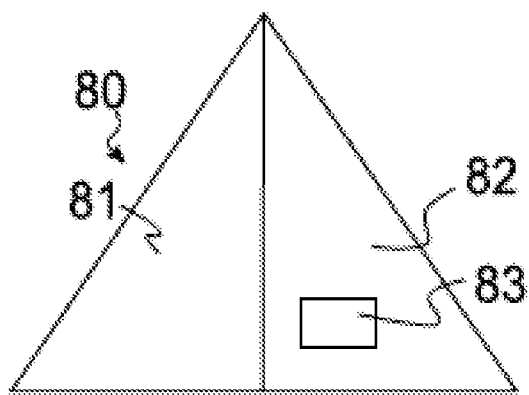
FIGS. 7A-7C shows examples of some further possible pattern shapes.
Figure 7B:
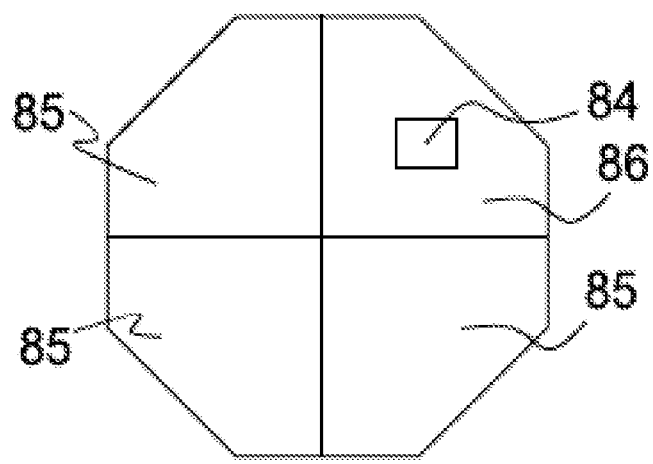
Figure 7C:
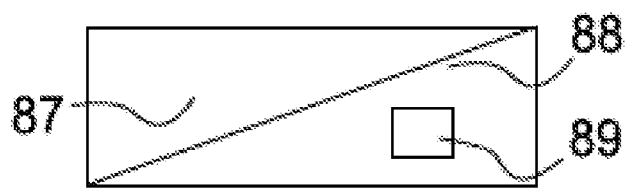

In the above examples the patterns have rectangular shape. For grid-based pathfinding algorithms, rectangular shapes are considered appropriate in various applications. However, other shapes, for example hexagonal or triangular patterns, are also possible. FIGS. 7A-C are examples of some possible pattern shapes and divisions. In FIG. 7A a triangular pattern 80 is divided into two smaller triangular patterns 81 and 82. Pattern 82 includes a movement obstacle 83 while patterns 81 is provides freedom of movement. FIG. 7B shows an octagonal pattern that has been divided into four smaller patterns. Smaller patterns 85 are free of obstacles while an obstacle 84 is determined in pattern 86. FIG. 7C illustrates the possibility of dividing a rectangular patterns into at least two triangular patterns 87 and 88. Only pattern 88 covers an obstacle 89 in this example.

An example for a specific path finding process and accordingly configured apparatuses will be described next with reference to FIGS. 8 to 16. In the example a two-dimensional path finding grid can be created on top of a real-world map of an area indicated as having no-go areas. The initial inputs in a grid can include coordinates of a moving device, target coordinates, and coordinates of an item or items of relevance. The grid can be configured to define device location, target location and relevant items, e.g., NFZs or other no-go areas. Grid cells touching a no-go area can be marked as obstacles in the grid system. A 2D grid based pathfinding algorithm (for example a jump point search) can be applied to a grid to generate a path of travel.

In further example embodiments cells are using middle point of each cell as potential waypoint of the path. If the middle point of cell of grid is covered by obstacle, cell is blocked, for example. Blocked means that the cell cannot be used as part of path in grid based path finding algorithm, for example. Otherwise the grid can be used as free cell and can be used in the path. The path calculated follows the middle point of selected free cells as waypoints around the obstacles. The use of grid avoids the calculations of added dot markings on the display. The number of dot markings may be not exact and in case of many dots it might make the calculation problematic in digitalized environment and accuracy is decreasing.

Furthermore, in example embodiment there are two points of initial path which intersect with outer grid area around the obstacle. The first intersection point is in that side of grid which is directing the start of path and second intersection point in that side of grid which is towards end of path. The intersection points corresponding cells of grid, respectively, are selected as start and end points of the path search algorithm like grid based path finding algorithm. The algorithm may be run.

In example embodiment when the waypoints are in consecutive order, first three waypoints may be used, for example. First three waypoints may be started from different points. Intermediate (center) waypoint is located between first and third waypoints of the three consecutive waypoints. Depending on the situation the intermediate waypoint may be used in the path or it can be removed. Intersection analysis may be continued until there are no further removal in the selected three consecutive points, for example.

In example embodiment after the path between two points of initial path which intersect with outer grid area around the obstacle is finished, the path obtained from grid based path finding algorithm is combined with the initial path to compose the final path.

Real world x and y coordinates can be used in a path-finding algorithm and conversion provided to and from latitude and longitude using a grid based system which has a conversion functionality. The path cell coordinates can be converted to real-world coordinates providing an initial rough path.

The initial rough path can be cleaned-up from excess waypoints by looping through path waypoints. Examples of the clean-up will be described in more detail below with reference to drones and NFZs.

FIGS. 8A, B, C and D show possible initial stages for path finding within a tile. In the example a 2D grid corresponding to a real-world area is created for a drone. FIG. 8A shows a 2D grid 130 created on top of an area of interest. A start location 131, a target location 132 and a no-fly zone 133 are also shown. Input values for a path finding algorithm from start location to target location without crossing the no-fly zone can comprise coordinates at the start, target location coordinates, and a no-fly zone polygon coordinates.

The grid 130 comprises cells 134. Grid cells touching a no-fly zone can be marked as obstacles. In FIG. 8B such cells are denoted by reference 135. Finding of obstacle cells can be done, for example, by looping through all grid cells and checking if a centre point of a cell is contained inside the no-fly zone polygon. The grid-based pathfinding algorithm can then be applied to the grid to find waypoints 136 around the obstacle 133. For example, a jump point search algorithm may be applied to the grid at this stage. The resulting turning cells, i.e., waypoints 136 found by jump point search algorithm are shown in FIG. 8C. Obtained path cell coordinates can then be converted to real-world coordinates to provide an initial rough path 137 via the waypoints 136, this being shown in FIG. 8D.

The 2D grid based algorithm may only support movement in eight directions, and because of this the initial rough path 137 may comprise one or more excess waypoints, and thus unnecessary turns. A clean-up operation may be provided to remove any possible excess waypoints. A clean-up algorithm may comprise looping through the waypoints 136 on the initial path 137 to check if any of these can be removed. After grid-based pathfinding has found a path for use, then it may be cleaned-up.

The way as described relating to FIGS. 8A, B, C and D may be used as possible feature for path finding in accordance with the examples described in FIGS. 3, 4 and 5 between entrance and exit points such as 67 and 68, An and Bn. The examples illustrated in FIGS. 9-11 can be used to further enhance performance.

FIGS. 9A to 9E illustrate an example for the looping. In this example a line from waypoint n to n+2 is created for each waypoint n (n goes from 0 to full length −2). If the line between n to n+2 does not intersect with the no-fly zone 133, waypoint n+1 can be removed. Otherwise, n is incremented by 1.

Instead of n being an integer, a non-integer, a ratio or decimal number, for example, may be used. The latitude and longitude can be calculated, e.g., by distance to the point (n+1)/p or (n+2)/p from n, where p can be integer. This might be case, e.g., when another NFZ is located at the other end of a route.

In FIG. 9A n=the start point 131 of the initial rough path 137. Because there is no intersection by the line between n and n+2, waypoint n+1 of the initial path 137 can be removed. As a result, the path can be straightened by replacing the path segment via waypoints n, n+1, and n+2 with a new straight path segment 140 between waypoints n and n+2 (denoted by reference 142).

In FIG. 9B next check is made using the start point 131 again as n=0, the end point 142 of segment 140 as n+1, and the next waypoint as n+2. It is determined that line 141 between n and n+2 would intersect the obstacle 133. Thus waypoint 142 is confirmed as a valid waypoint and line 140 can be made a segment of the final path.

The looping can now progress to the step shown in FIG. 9C where waypoint n=0 is provided by the end point 142 of path segment 140. The determination reveals that the straight line 144 connecting waypoints n and n+2 does not intersect the obstacle 133 and length of straight line 144 is less than combined lengths of lines 139A and 139. Thus waypoint n+1 can be removed, and the path straightened by replacing the path segment via waypoints n, n+1, n+2 with a new path segment 144.

In FIG. 9D a check is made using waypoint 142 again as n=0, the end point 143 of segment 144 as n+1, and the target point 132 as n+2. It is determined that line 145 between n (denoted by reference 142) and n+2 (denoted by reference 132) would not intersect the obstacle 133. Thus point 132 is confirmed as a valid next point, waypoint n+1 (denoted by reference 143) is ignored, and line 145 is made a segment of the final path.

A problem is how to find a straightened line. If the path is calculated by grid based or tile based algorithm, for example, the determined path may not necessarily be the straightest. For straightening turn points (e.g. waypoints) calculated from the algorithms may be used together with start and target points in the path. The path may be straightened by calculating the distance from start point through first turn point to second turn point. If the line from the start point to the second point is not intersecting the obstacle, and the distance is less than the distance through the start, first and second points, the straightening may be provided and the first turn point is not needed (point n+1 in FIG. 9A). Next the straightening action can relate to second and third turn points from start point (see FIG. 9B). In that case the line between the start point and the third turn point intersects the obstacle and straightening is not possible. In FIG. 9C the second, third and fourth turn points are under consideration. If the line between the second and the fourth turn points is less than the length of the path through the second, third and fourth turn points the line between the second and the fourth turn points can be used in the path and the third turn point may need not be used. In FIG. 9D the line may be further straightened between second turn point and the target point. The fifth turn point may not be used. There may be one or more straightening need in the path and FIG. 9 show an example where the straightening is possible in three cases and not used in one case. In this solution the three points are needed from the group of start, target and turn points. Line intersection algorithm may be used, for example. The order of straightening steps is an example. The point coordinates may be used in the computations.

FIG. 9E illustrates the final, cleaned-up path of travel 148. The looping clean-up algorithm can stop in response to detection that there are no n+2 waypoints left in the initial rough path.

In this example the check was made in view of n+2 waypoints. However, a check can also be made in view of a waypoint further ahead. That is, instead of having a loop where the testing is based on n+2 the looping can be based on testing n+m where m greater than 2. If there is no intersection, any intervening waypoints (n+1 to m−1) may then be ignored at once.

Line intersection checks can be done using original coordinates instead of grid cells. This may provide some advantage, e.g., in view of better accuracy. E.g., the check at the step of FIG. 9C would result a detection of an intersection with the obstacle 133 if the check was made using the cells of the grid 130 of FIGS. 8A to 8D. That is, the line would cross cell 138, and be determined as an intersecting line.

Any appropriate line intersection check algorithm can be used for the check. If intersection is found in one line, the algorithm stops. In computations, x and y coordinates can be replaced with latitude and longitude values. A non-limiting example is shown in FIG. 10. Line 141 is compared sequentially to the five border lines (sides 1 to 5 of the polygon) that define the no-fly zone polygon 133. On a second iteration, an intersection is detected with line 152 where after the algorithm stops. This correspond to the situation of FIG. 9B. After line intersection check algorithm stops, next step is to either to continue to check the intersection of next line of polygon and if that was the last line of polygon then continuing to next line of the path (starting from next waypoint n).

In accordance with a further example a path is determined from start to target in a tile where there are one or a number of no-fly zones scattered in the area of the tile. A problem in such circumstances may arise because of a possible need of a relatively large grid to catch small obstacles, and this may not be optimal for performance reasons. A way of addressing this is to create one or more grids or a combination of grids around the one or more no-fly zones that are on the direct path within the patterns to be analysed. The paths within the one or more grids can be solved as explained.

Such situation within the greatest zoom level is illustrated in FIG. 11A. More particularly, it can be determined that NFZ's 162 and 163 are on a direct line 164 between points 160 and 161. The detection may be based on a line-polygon intersection algorithm, e.g. line-rectangle intersection (with NFZ bounding box), or line-point distance check using NFZ center and distance to furthest vertex, for example.

The direct parts of path are usually much longer than the parts of obstacle, in drone paths, for example. One reason is that obstacles are tried to be reduced in the path planning. The paths in the air are less crowded with obstacles and more freedom is possible to determine the path, for example. The path on the ground are having more obstacles in the paths compared to air where drones are used and therefore more grid based algorithm calculation in the path on the ground is needed and also the whole path can use grid based algorithms. Drones as flying objects need power efficiency, and less computation is better enhancing flying time, for example.

Local grids 165 and 166 can then be created around relevant NFZs 162 and 163, see grids FIG. 11B. The other NFZs can be ignored.

In example of embodiment if the middle point of cell is covered by the obstacle, cell is blocked. Blocked means that the cell cannot be used as part of rough path waypoint in grid based algorithm. Otherwise the grid cell, if the middle point of cell is not covered by obstacle, can be used as free cell, i.e. middle point as waypoint can be used in the initial path.

As known the real-world coordinates are in a form of "latitude, longitude" or normal wgs84 coordinates. Coordinates for grids start (0, 0) from left top corner of the selected grid covering obstacle and are integers. When grid is created it may be created to some area in the world, i.e. area of the obstacle. The creation may be done so that real world coordinates corresponds grid cell (0, 0). The size of cell of grid is 5 m, for example, it describes how much the coordinate changes between the cells. For example, in a grid with cell size of 5 m, the cell (10, 5) is defined to be 50 m to the East and 25 m to the south of cell (0, 0).

Pathfinding as explained above can be applied to each grid to determine rough paths through the grids 165 and 166. This is illustrated in FIG. 11C. The start points within the grid can be the points/cells of entrance and exit. In grid 165 there are cells 167 and 168, respectively.

In FIG. 11D initial rough paths 170 and 171 are determined through local grids 165 and 166, respectively. In FIG. 11E the combined initial rough path is subjected to clean-up operations. The local grids can be cleaned-up in parallel operations, or one by one. FIG. 11F illustrates the cleaned-up final path 176.

Different grid based algorithms may be used as appropriate. A grid may be created using zooming tiles, or a grid may be created around the prohibited zone.

Figure 12:
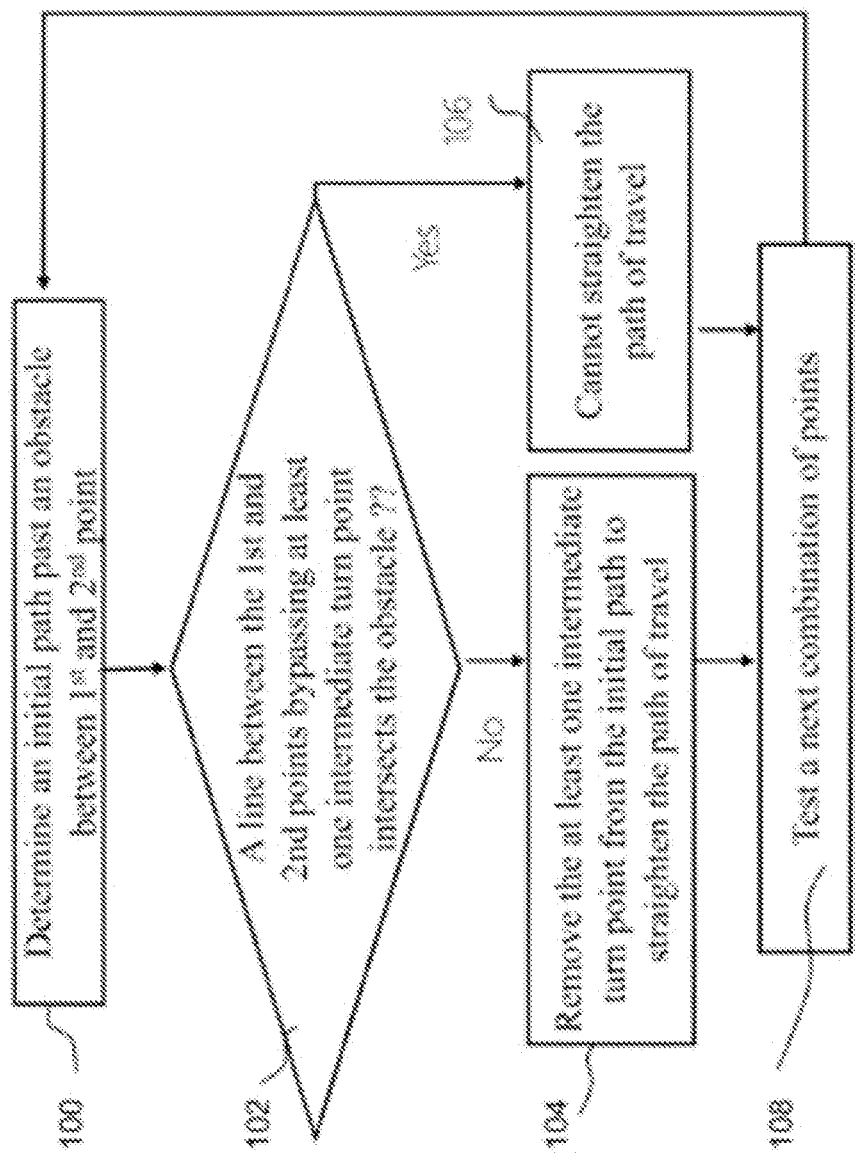
FIG. 12 is a flowchart for operation according to an example.

FIG. 12 shows a flowchart according to an example for a clean-up method of a path of travel. In the method an initial path past an obstacle between the first point and the second point is first determined at 100. The initial path can comprise at least a third point and a fourth point between the first point and the second point, the at least two intermediate points between the first point and the second point being turn points where the direction of travel changes. It can then be determined at 102 whether a line between two of the points passing at least one of the turn points does not intersect the obstacle. If the line does not intersect the obstacle, the at least one turn point can be removed at 104 from the initial path to determine a straightened path of travel. The testing can then move to testing of a next combination of points at 108 until all points are tested.

If the line tested does intersect with the obstacle, it can be determined at 106 that the straightening is not possible. Testing can then be repeated at 108 for a next combination of points.

At the repeat stage it is possible to use the next point on the initial path as a starting point. Alternatively, if two or more intermediate points were bypassed at the previous test cycle the next test cycle may try with a lesser amount of intermediate turn points.

The determining of the initial path can comprise using a grid on the area of travel. The grid may be a local grid. The determining whether the line between two of the points passing at least one of the turn points intersects the obstacle can comprise use of the original coordinates of the area.

In case of some distance between a start location and a target location and scattering of no-fly zones around the area, the grids can be created only around no-fly zones that are on the direct path from start to target. Each grid can then be solved separately.

Figure 13:
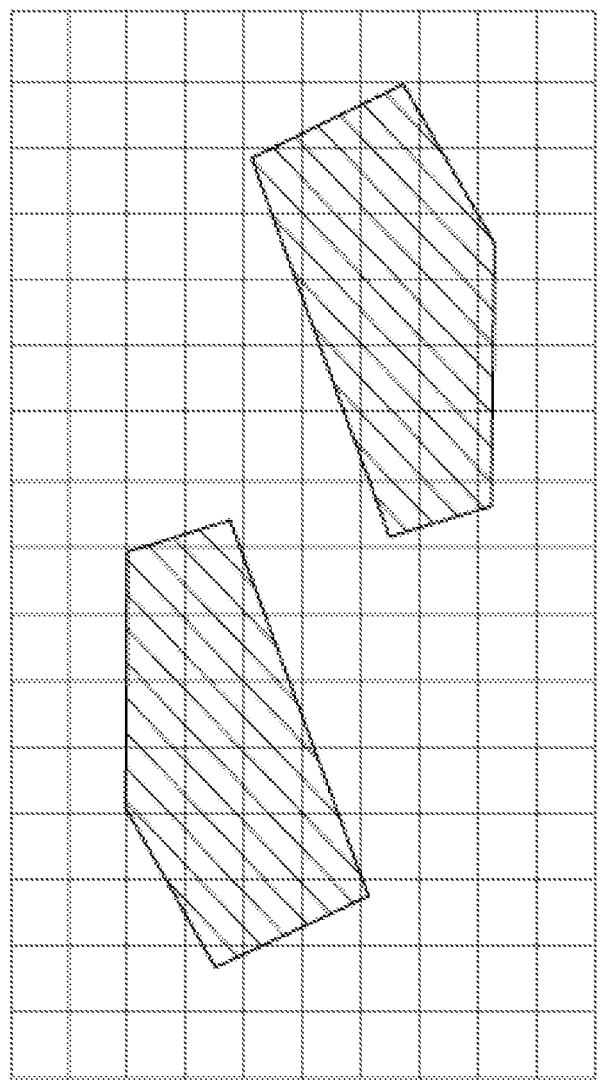
FIGS. 13, 14 and 15 are examples of shared grids.

Multiple no-fly zones can be located such that use of local grids may produce overlapping local grids. A shared grid may be generated that covers the two or more zones. A shared grid is illustrated in FIG. 13. Use of the shared grid may make it easier to find a path through an area than analysing overlapping grids. Shared grids may also reduce a risk of incorrect result caused by pathfinding algorithm on one grid producing a result path that could intersect with a no-fly zone present in an overlapping grid.

Figure 14:
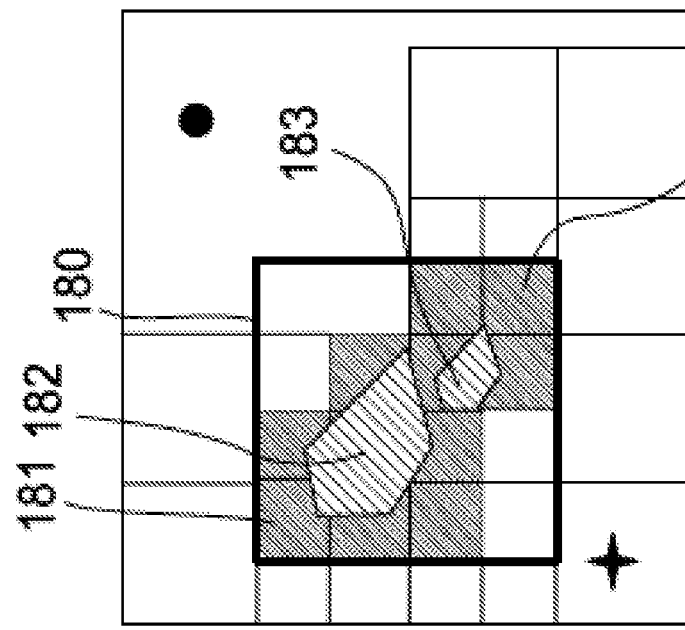

FIG. 14 shows an example of use of a local grid 180 on an area of interest indicated by grey zooming tiles 181. Two no-fly zones 182, 183 cross tile boundaries, and thus the small zoom tiles 181 are combined into a larger rectangle providing the grid 180. The local grid 180 covers a rectangular area such that all grey zooming tiles 181 are within the grid. The pathfinding algorithm is then applied to the grid 180 rather that the smallest tiles 181. FIG. 14 illustrates use of a shared grid in such occasion but similar principle can be applied to a single obstacle. This may be advantageous, e.g., with oddly shaped obstacles, for example.

Figure 15:
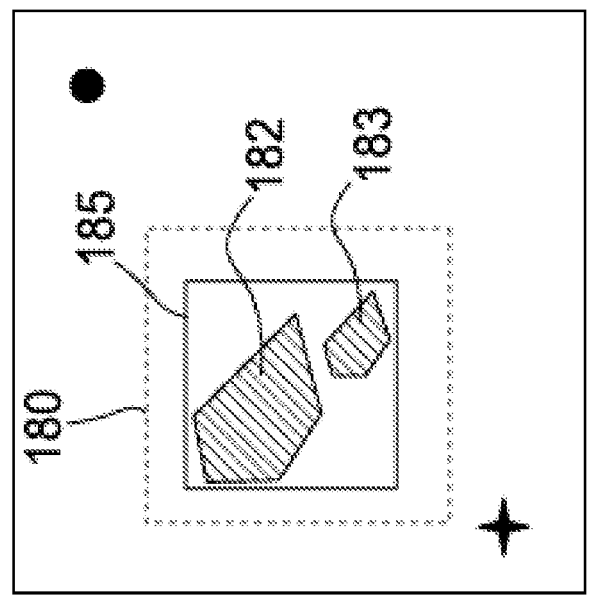

FIG. 15 shows a shared local grid 185. Grid 185 can be derived from the grid 180 of FIG. 14 (grid 180 of FIG. 14 is shown by a dashed line), or defined based on information of the obstacles. The periphery of the grid 180 can be defined by the zoom tiles 181. Size of grid 185 can be optimised from the size determined by the zoom tiles by minimising the distance between the borders of the obstacles 182 and 183 and the grid 185. The path finding and straightening operations can then be applied to the area of the optimised grid 185.

The local grid 185 for multiple no-fly zones or other no-go areas can also be provided on xy coordinate system for example such that when there are NFZs 182 and 183 in a local area, the left hand side of the NFZ 182 provides x min value. If this NFZ is also highest/extends furthest in the y direction it also provides y max value to the grid. The right-hand side of NFZ 183 then provides x max value. Again, because NFZ 183 provides the lowest point on the coordinate system it can also provide y min value to the grid in FIG. 15. Thus a shared grid may be generated that covers the two or more zones using area defined by x min, x max, y min and y max values. Appropriate padding can be used to ensure sufficient clearance between the obstacle(s) and the grid border.

FIG. 15 solution can have some benefit, e.g., when there is one NFZ that extends over several zooming tiles, resulting a relatively large grid.

Both solutions can be used to define a grid, either separately or combined. For example, there can be e.g. one NFZ close to end of the path and two NFZs which are close to the start. The local grid of FIG. 15 is created around the NFZs to keep the size of the grid as small as possible. The two NFZs close to each other can be combined using the y max, y min, x max and x min determined based on the grey zooming tiles.

In accordance with a possible operation an initial grid is received based on the zooming tiles. In the initial scenario the parameters can include UAV coordinates, target location coordinates, and no-fly zone polygon coordinates. To find a path from UAV location to the target location without crossing the no-fly zone a 2D grid that corresponds to the real-world area is created. Existing 2D grid-based pathfinding algorithm is applied to the 2D grid. The solution path is converted to back to real-world coordinates where after the path is cleaned-up from excess waypoints.

In accordance with a possible scenario there can be a long distance from start to target location while there are also some no-fly zones scattered around the area. To avoid creating a massive grid and avoid performance issues, grids can be created only around no-fly zones that are on the direct path from start to target. Each of the grid is then solved as explained above. Overlapping grids may be combined.

Figure 16B:
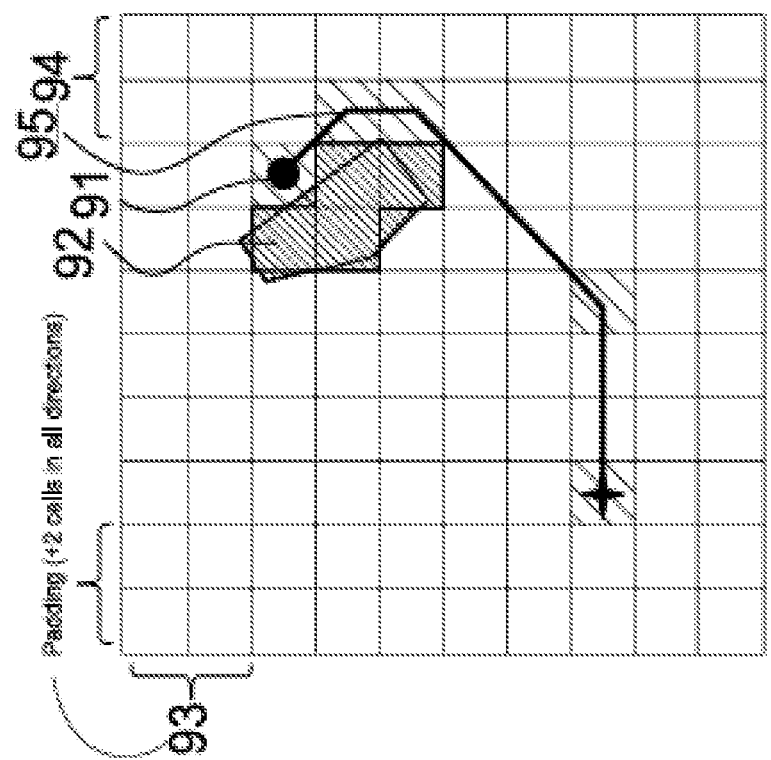
FIGS. 16A and 16B show an example of padding.
Figure 16A:
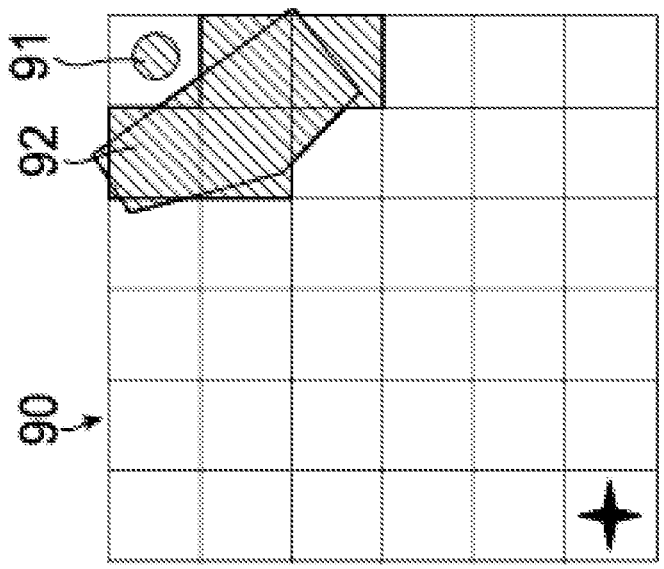

Grid generation may result a situation illustrated in FIG. 16A where a path might not be found. This can be so because start and/or target point 91 may be located immediately next to a no-fly zone 92 on a grid 90. Padding can be used to resolve this. An example of padding is illustrated in FIG. 16B where two rows 93 and columns 94 of cells are added on each side of the grid 90. An initial path 95 can be found around the nearby NFZ 92 despite the start point 91 being in a cell next to the NFZ.

In accordance with the herein described principles a pattern that has reached the maximum zoom level ($Z_{Max}$), i.e., covers the predefined smallest area, still covers any part of a no-go area such as a NFZ can be handled using any appropriate path finding algorithm. For example, an area within an identified pattern with an NFZ can be prepared for and handled by a standard 2-dimensional or 3-dimensional path finding algorithm with required accuracy. The larger zoom patterns can be assumed to be free of no-go areas, and therefore the path can be defined using a straightforward algorithm, for example be given a straight shortest path through the pattern.

A path search algorithm may create several paths and calculate lengths for each of the paths. The algorithm can be configured to return the shortest path as a solution. Other parameters like wind speed, direction of wind may be used as additional parameters when deciding the shortest path.

The clean-up algorithm may output a path requiring alteration of the entrance and/or exit points, such as those of FIGS. 3 to 5. In such case the entire path between start and target may need to be altered accordingly.

These principles can be used, for example, for drone path generator over larger operation areas. For example, control areas covering land areas greater than 100×100 km with accuracy of several meters can be provided. It is possible to add and remove non-fly zones or the like areas in run time, since a non-fly zone may affect only one or a few zoom tiles, for example.

In accordance with an aspect apparatuses and methods for movement control of a device in a controlled area are arranged to operate without the zoom feature. An apparatus may comprise memory for storing information of patterns covering sectors of a controlled area, the stored information comprising determination whether the patterns have at least one item relevant to movement in the area. Processor apparatus can configured for determining that a search path between a first location and a second location crosses at least one pattern having at least one item relevant to movement in the area for using a path finding algorithm to determine a path of movement within the determined at least one pattern having at least one item relevant to movement in the area.

In accordance with an aspect a method for configuring data in database storage for movement control of a device is provided. The method comprises configuring patterns in the data storage covering sectors of a controlled area, the configuring comprising determining at least one pattern that has at least one item relevant to movement in the area, dividing the determined at least one pattern into smaller patterns, determining at least one of the smaller patterns with at least one item relevant to movement in the area, and repeating the dividing step until predefined smallest pattern size is reached.

In accordance with an aspect a system for movement control is provided, the apparatus comprising a control station, a movable device controlled by the control station and communication interface apparatus for exchange of control instructions between the control station and the device. The control station comprises processor apparatus and memory for storing information of patterns covering sectors of the area, the stored information comprising indication whether the patterns have at least one item relevant to movement in the area, the information being configured by the processor apparatus based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached. The processor apparatus is further configured to determine that a search path between a first location and a second location extends through the at least one pattern having the at least one item relevant to the movement in the area and to selectively use a path finding algorithm to determine a path of movement within the at least one pattern through which the search path extends and cause communication of instructions through the interface apparatus based on the determined path of movement.

An appropriate data processing apparatus configured for the computations and/or computer code product can also be provided. Such method and apparatus can be used to configure zoom data in the data storage for a controlled area. In accordance with an aspect a method for movement control of a device comprises obtaining data defining patterns covering sectors of a controlled area, the patterns comprising at least one pattern of a predefined smallest pattern size and having at least one item relevant to movement in the area, the pattern being divided from a larger pattern to the predefined smallest pattern size, determining that a search path between a first location and a second location extends through at least one of the patterns having at least one item relevant to movement, and using a path finding algorithm to determine a path of movement within the determined at least one pattern through which the search path extends. An appropriate data processing apparatus configured for the necessary computations and/or computer code product can also be provided. Such method and apparatus can be used to utilise configured zoom data for a controlled area in planning a route in the area.

In accordance with a non-limiting example control information may be transmitted to an unmanned device as Micro Air Vehicle Link (MAVLink) commands. MAVLink is an open source, point-to-point communication protocol used between a ground control station and unmanned vehicles to carry telemetry and to command and control unmanned vehicles. It may be used to transmit the orientation of an unmanned vehicle, its GPS location and speed. The MAVLink protocol operates at the application layer. It is noted that MAVLink is only given herein as an illustrative example of a protocol operating at this level for this purpose, and other protocols and message sizes may be used instead of this.

Unmanned vehicles may form a swarm. One of such unmanned vehicles may be configured to act as the leader of the swarm, and a path of movement may only need to be defined for the leader.

It is noted that although FIG. 1 depicts an unmanned aerial vehicle comprising rotors, other types of UAV are possible and the principles are also applicable to systems not needing to comprise any rotors. For example, an unmanned vehicle may be a lighter-than-air gas balloon with thrusters, a miniature aircraft, miniature helicopter or even a full-sized light aircraft.

In one embodiment it is determined an initial path past an obstacle between a first point and a second point, wherein the initial path comprises at least two turn points between the first point and the second point, further determined whether a line between two of the points and bypassing at least one of the turn points intersects the obstacle, and further determined a straightened path of travel in response to determination that the line between two of the points and bypassing the at least one of the turn points does not intersect the obstacle by removing the at least one bypassed turn point from the initial path.

In an example causing the apparatus further to determine the first and second points to be points between which grid based path finding algorithm around the obstacle is used. In further example of the example causing the apparatus further determine grid cells provided with the at least two turn points in the determined path around the obstacle, convert the grid cell coordinates of the at least two turn points and the first and second points in the determined path around the obstacle to real-world coordinates, select at least three points from the at least two turn points and the first and second points wherein the three points are consecutive, determine a line between the first point and third point of the consecutive points, determine whether the line and the obstacle intersect, if no intersection, remove the middle point of the consecutive points and use the line as part of the straightened path, or if intersection found keep the second waypoint as part of the straightened path.

The control apparatuses described herein can comprise appropriate circuitry. As used in this specification, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASystem InformationC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to the flow and signaling charts may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

A control apparatus for controlling a device may comprise means for movement control in an area, the apparatus comprising memory means for storing information of patterns covering sectors of the area, the stored information comprising indication determination whether the patterns have at least one item relevant to movement in the area, the information being configured based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached. The apparatus further comprises processor means configured to determine that a search path between a first location and a second location extends through at least one pattern having at least one item relevant to movement in the area and to selectively use a path finding algorithm to determine a path of movement within the at least one pattern through which the search path extends.

The processor means can be configured to use the path finding algorithm to patterns with items relevant to movement that have the predefined smallest pattern size. The processor means may also be configured to generate a path of movement for the device based on a combination of information of the search path outside the at least one pattern having at least one item relevant to movement and crossed by the path search and the determined path within the at least one pattern.

The processor means may further be configured to at least one of combine the determined path within the at least one pattern with parts of the search path outside the at least one pattern, adjust a point of entrance of the search path to the at least one pattern, and adjust a point of exit from the at least one pattern. The processor means may be configured to move a point of entrance to at least one pattern and/or a point of exit from at least one pattern according to the determined path within the at least one pattern, and combine the determined path within the at least one pattern with a path or paths of travel outside the at least one pattern and generated based on information of the search path and the moved point of entrance and/or point of exit.

The processor means may be configured to use the path finding algorithm for patterns that have been determined to have at least one item relevant to movement and wherein the path of movement is generated for an area outside the patterns that have been determined to have at least one item relevant to movement based on assumption that there are no items relevant to movement within the area.

A computer program comprising instructions to be run on processor apparatus for generating data for movement control in a memory can be configured to perform generating comprising at least configuring patterns in the memory covering sectors of a controlled area, the configuring comprising determining at least one pattern that has at least one item relevant to movement in the area, dividing the determined at least one pattern into smaller patterns, determining at least one of the smaller patterns with at least one item relevant to movement in the area, and repeating the dividing step until predefined smallest pattern size is reached.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. An apparatus comprising:
   at least one processing core; and
   at least one memory including computer program code,
   the at least one memory and the computer program code configured to, with the at least one processing core, cause the apparatus at least to:
   control a movement of a device in an area;
   divide the area into a plurality of patterns, wherein a respective pattern comprises a sector of the area;
   store information associated with the plurality of patterns, wherein the stored information comprises an indication of whether the plurality of patterns comprise at least one item relevant to the movement in the area, wherein the stored information is configured based on a determination that at least one of the plurality of patterns comprise the at least one item relevant to the movement in the area;
   divide, responsive to the determination, the at least one pattern into smaller patterns;
   determine whether at least one of the smaller patterns comprises the at least one item relevant to the movement in the area, wherein division of the smaller patterns repeats based on a determination that the at least one of the smaller patterns comprises the at least one item relevant to the movement in the area until a predefined smallest pattern size is reached; and
   determine that a search path between a first location and a second location extends through the at least one pattern having the at least one item relevant to the movement in the area and selectively use a path finding algorithm to determine a path of movement within the at least one pattern through which the search path extends that avoids the at least one item relevant to the movement in the area.

2. The apparatus according to claim 1, wherein the device comprises one of an unmanned aerial vehicle, driverless land vehicle or driverless vessel.

3. The apparatus of claim 1, configured to use the path finding algorithm on respective ones of the plurality of patterns that (i) comprise items relevant to the movement in the area and (ii) have been divided to the predefined smallest pattern size.

4. The apparatus of claim 3, wherein the predefined smallest pattern size comprises highest resolution zoom level of the patterns.

5. The apparatus of claim 1, wherein the patterns comprise rectangular tiles, at least one of the rectangular tiles being divided into smaller rectangular tiles in response to determining the at least one item relevant to movement within the at least one rectangular tile.

6. The apparatus of claim 1, wherein cause the apparatus further be configured to generate a combined path of movement for the device based on a combination of information of the search path outside the at least one pattern crossed by the search path and having at least one item relevant to movement and the determined path within the at least one pattern.

7. The apparatus of claim 6 wherein cause the apparatus further be configured to combine the determined path within the at least one pattern with parts of the search path outside the at least one pattern.

8. The apparatus of claim 6, wherein cause the apparatus further be configured to
adjust a point of entrance of the search path to the at least one pattern, and/or adjust a point of exit from the at least one pattern.

9. The apparatus of claim 6, wherein cause the apparatus further be configured to move a point of entrance to at least one pattern and/or a point of exit from at least one pattern according to the determined path within the at least one pattern, and combine the determined path within the at least one pattern with a path or paths of travel outside the at least one pattern and generated based on information of the search path and the moved point of entrance and/or point of exit.

10. The apparatus of claim 3, wherein cause the apparatus further be configured to use the path finding algorithm for patterns that have been determined to include at least one item relevant to movement.

11. The apparatus of claim 1, configured to generate the information comprising indication whether the patterns have at least one item relevant to movement in the area based on determination of at least one pattern that has at least one item relevant to movement in the area, division of the determined at least one pattern into smaller patterns, determination of at least one of the smaller patterns with at least one item relevant to movement in the area, and repeat of the division until predefined smallest pattern size is reached, wherein the generation is provided at the runtime of the device and/or before the determination of the path of movement for the device.

12. The apparatus of claim 3, wherein the items relevant to movement in the area comprise at least one of an obstacle, a no-go area, and a no-fly zone.

13. The apparatus of claim 3, wherein cause the apparatus further be configured to apply a path straightening operation to an initial path output from the path finding algorithm.

14. The apparatus of claim 13, wherein cause the apparatus further be configured to determine the initial path based on a local grid on the area indicated by the determined at least one pattern.

15. The apparatus of claim 14, wherein cause the apparatus further be configured to modify the initial path by removing one turning point and testing if the modified initial path crosses the at least one item relevant to movement.

16. A method comprising:
controlling a movement of a device in an area;
dividing the area into a plurality of patterns, wherein a respective pattern comprises a sector of the area;
storing information associated with the plurality of patterns, wherein the stored information comprises an indication of whether the plurality of patterns comprise at least one item relevant to the movement in the area, wherein the stored information is configured based on a determination that at least one of the plurality of patterns comprise the at least one item relevant to the movement in the area;
dividing, responsive to the determination, the at least one pattern into smaller patterns;
determining whether at least one of the smaller patterns comprises the at least one item relevant to the movement in the area, wherein division of the smaller patterns repeats based on a determination that the at least one of the smaller patterns comprises the at least one item relevant to the movement in the area until a predefined smallest pattern size is reached; and
determining that a search path between a first location and a second location extends through the at least one pattern having the at least one item relevant to the movement in the area and selectively using a path finding algorithm to determine a path of movement within the at least one pattern through which the search path extends that avoids the at least one item relevant to the movement in the area.

17. The method of claim 16, wherein selectively using the path finding algorithm comprises using the path finding algorithm on respective ones of the plurality of patterns that (i) comprise items relevant to the movement in the area and (ii) have been divided to the predefined smallest pattern size.

18. The method of claim 17, wherein the predefined smallest pattern size comprises highest resolution zoom level of the patterns.

19. The method of claim 16, wherein the patterns comprise rectangular tiles, at least one of the rectangular tiles being divided into smaller rectangular tiles in response to determining the at least one item relevant to movement within the at least one rectangular tile.

20. The method of claim 16, further comprising generating a combined path of movement for the device based on a combination of information of the search path outside the at least one pattern crossed by the search path and having at least one item relevant to movement and the determined path within the at least one pattern.

* * * * *